(12) United States Patent
Yoshimoto et al.

(10) Patent No.: US 8,284,851 B2
(45) Date of Patent: Oct. 9, 2012

(54) TRANSMISSION APPARATUS, RECEPTION APPARATUS, COMMUNICATION SYSTEM, TRANSMISSION METHOD AND RECEPTION METHOD

(75) Inventors: Takashi Yoshimoto, Osaka (JP); Ryota Yamada, Osaka (JP); Kazuyuki Shimezawa, Osaka (JP); Naoki Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 134 days.

(21) Appl. No.: 12/936,065

(22) PCT Filed: Mar. 30, 2009

(86) PCT No.: PCT/JP2009/056477
§ 371 (c)(1),
(2), (4) Date: Nov. 4, 2010

(87) PCT Pub. No.: WO2009/123101
PCT Pub. Date: Oct. 8, 2009

(65) Prior Publication Data
US 2011/0038430 A1    Feb. 17, 2011

(30) Foreign Application Priority Data
Apr. 3, 2008   (JP) ................... 2008-097464

(51) Int. Cl.
*H04K 1/10* (2006.01)
*H04L 27/28* (2006.01)

(52) U.S. Cl. ........ 375/260; 375/267; 375/299; 370/203; 370/208; 370/210; 714/748; 714/749

(58) Field of Classification Search ................... 375/260, 375/267, 299; 370/203–211; 714/748–751; 455/510
See application file for complete search history.

(56) References Cited

U.S. PATENT DOCUMENTS

| | | | |
|---|---|---|---|
| 2003/0097629 A1* | 5/2003 | Moon et al. | 714/751 |
| 2007/0133701 A1 | 6/2007 | Iwami | |
| 2007/0155387 A1* | 7/2007 | Li et al. | 455/441 |
| 2009/0116542 A1 | 5/2009 | Suzuki et al. | |

FOREIGN PATENT DOCUMENTS

| | | |
|---|---|---|
| JP | 2004-104574 A | 4/2004 |
| JP | 2007-124419 A | 5/2007 |
| JP | 2007-159066 A | 6/2007 |
| WO | WO 2007/099853 A1 | 9/2007 |

OTHER PUBLICATIONS

David Chase, "Code Combining—A Maximum-Likelihood Decoding Approach for Combining an Arbitrary Number of Noisy Packets," IEEE Transactions on Communications, vol. Com-33, No. 5, May 1985, pp. 385-393.

Joachim Hagenauer, "Rate-Compatible Punctured Convolutional Codes (RCPC Codes) and Their Applications," IEEE Transactions on Communications, vol. 36, No. 4, Apr. 1988, pp. 389-400.

* cited by examiner

*Primary Examiner* — Curtis Odom
(74) *Attorney, Agent, or Firm* — Birch, Stewart, Kolasch & Birch, LLP

(57) ABSTRACT

Data errors are sufficiently corrected and desired transmission quality is obtained even when the time variation of fading is large in a multicarrier transmission scheme communication system to which HARQ is applied. A transmission apparatus 100 is applied to a communication system in which the transmission apparatus and a reception apparatus perform automatic repeat request control therebetween, and has a subcarrier spacing setting section 111 that sets the subcarrier spacing used in transmitting a retransmission signal to be larger than the subcarrier spacing used in transmitting a first transmission signal, an IFFT section 112 that performs IFFT (Inverse Fast Fourier Transform) on an input signal based on the subcarrier spacing set in the subcarrier spacing setting section 111, and a transmission section 102 that transmits the first transmission signal and at least one retransmission signal.

7 Claims, 17 Drawing Sheets

FIG.4

| R=3/4 | PATTERN 1 $\begin{pmatrix} x \\ z \\ z' \end{pmatrix} = \begin{pmatrix} 111111 \\ 100000 \\ 000100 \end{pmatrix}$ | PATTERN 2 $\begin{pmatrix} x \\ z \\ z' \end{pmatrix} = \begin{pmatrix} 000000 \\ 000110 \\ 110000 \end{pmatrix}$ | PATTERN 3 $\begin{pmatrix} x \\ z \\ z' \end{pmatrix} = \begin{pmatrix} 000000 \\ 011000 \\ 000011 \end{pmatrix}$ |
|---|---|---|---|

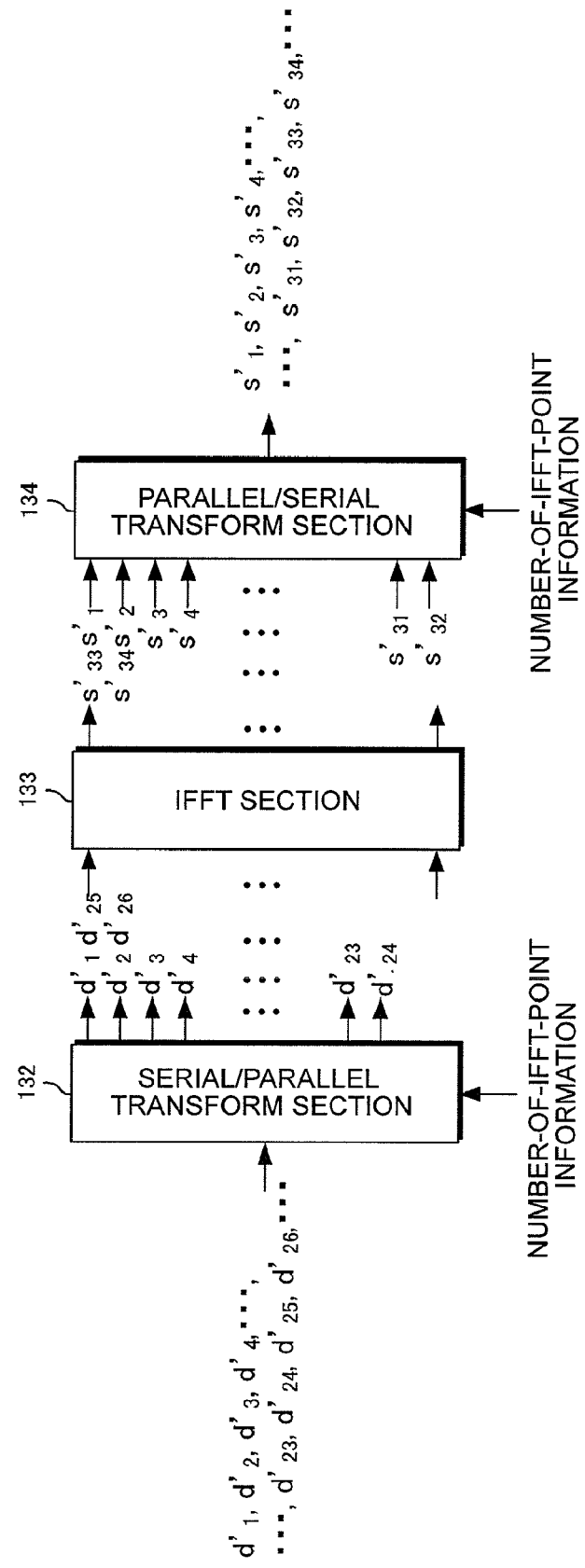

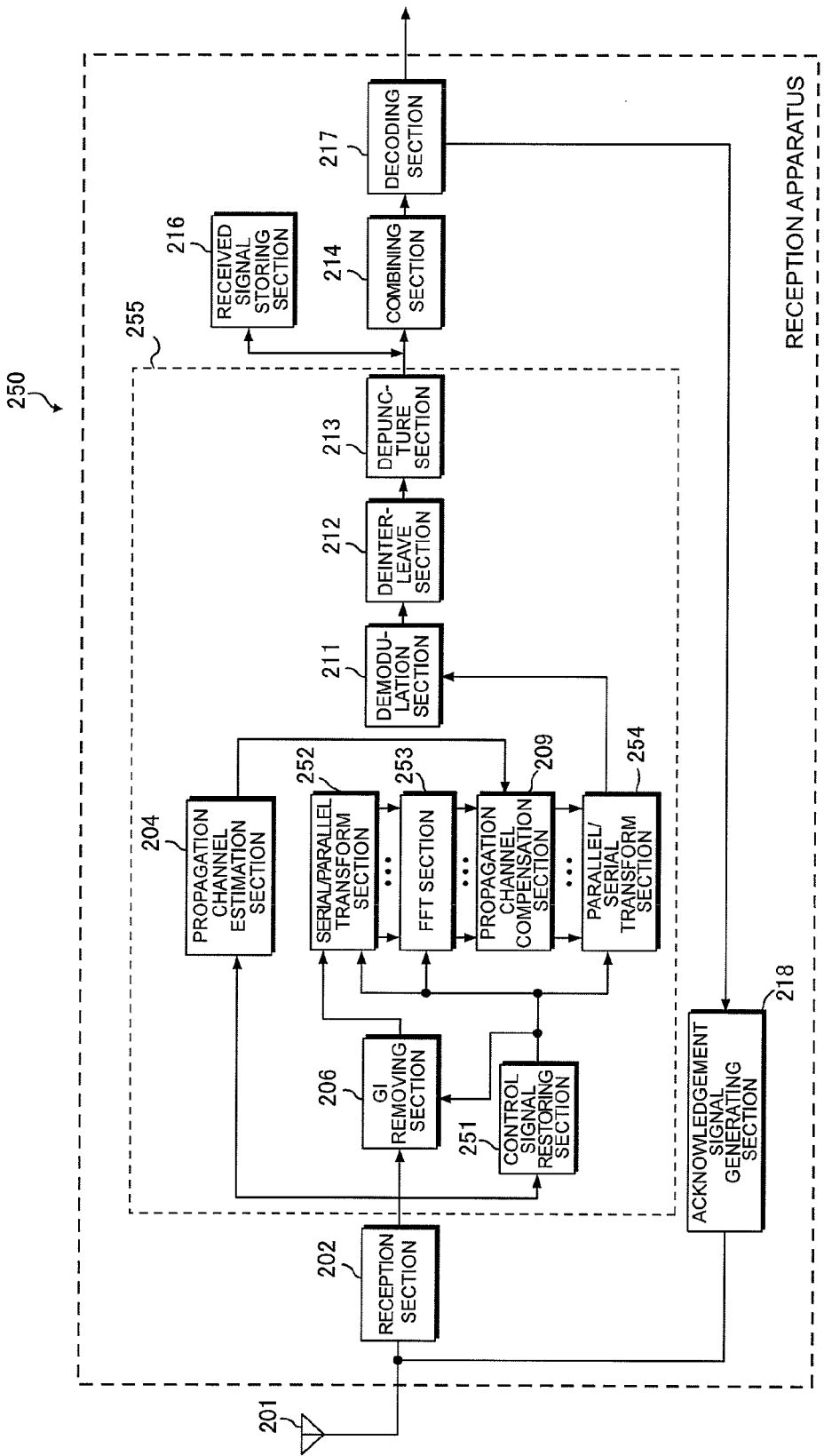

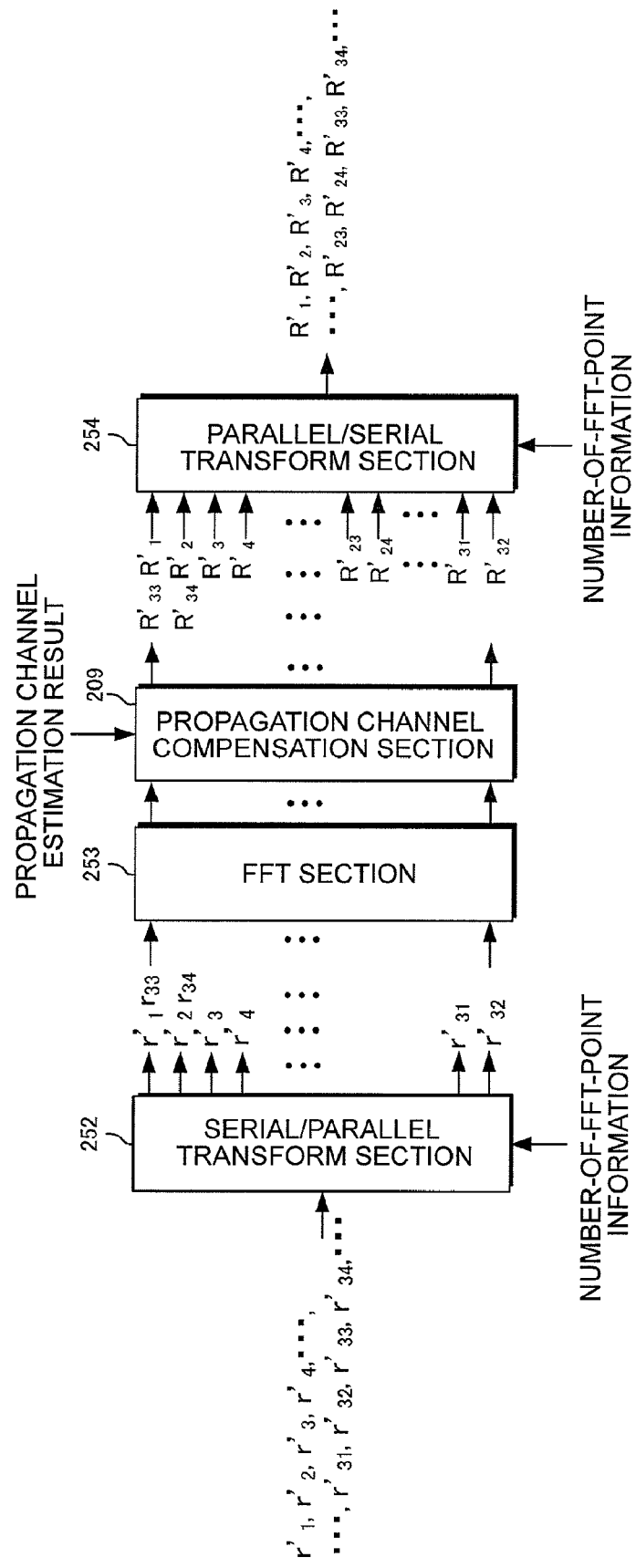

TRANSMISSION APPARATUS, RECEPTION APPARATUS, COMMUNICATION SYSTEM, TRANSMISSION METHOD AND RECEPTION METHOD

TECHNICAL FIELD

The present invention relates to techniques for performing automatic repeat control between a transmission apparatus and a reception apparatus in a communication system.

BACKGROUND ART

Conventionally, error control techniques have been used to guarantee the transmission quality satisfying QoS (Quality of Service) or the like in communication systems in which packet transmission is performed. As this error control technique, Non-patent Documents 1 and 2 describe Hybrid-ARQ (HARQ) obtained by combining ARQ (Automatic Repeat reQuest) and error correcting coding such as turbo coding. HARQ is a technique in which a reception apparatus requests retransmission to a transmission apparatus when detecting an error in a received signal, and performs decoding processing on a combined signal of the repeatedly received signal and already received signal.

Particularly, as HARQ, Chase Combining (CC) and IR (Incremental Redundancy) are known well. For example, in HARQ using CC, when an error is detected in a received packet, retransmission of absolutely the same packet is requested. By combining these two packets, it is possible to increase the reception quality. Meanwhile, in HARQ using IR, since redundant bits are divided to retransmit sequentially bit by bit, as the number of retransmission times increases, the coding rate is decreased, and it is possible to strengthen the error correcting capability.

Non-patent Document 1: D. Chase, "Code combining—A maximum likelihood decoding approach for combing and arbitrary number of noisy packets," IEEE Trans. Commun., vol. COM-33, pp. 385-393, May 1985.

Non-patent Document 2: Hagenauer, "Rate-compatible punctured convolutional codes (RCPC codes) and their application," IEEE Trans. Commun., vol. 36, pp. 389-400, April 1988.

DISCLOSURE OF INVENTION

Problems to be Solved by the Invention

In a communication system in which packet transmission is performed, as a transmission scheme for enabling high speed transmission in a multi-path fading environment, there are multicarrier transmission schemes. For example, in OFDM (Orthogonal Frequency Division Multiplexing) that is one of the multicarrier transmission schemes, in an environment in which the time variation of fading is large, for example, in high-speed moving, propagation channels are time-varied largely between a beginning frame and an end frame in frames generated by a plurality of OFDM symbols, or the beginning and the end within OFDM symbols. As a result, packet errors occur due to the propagation channel estimation error, inter-carrier interference, etc.

In the packet communication system using OFDM transmission, when quality deterioration due to the propagation channel estimation error, inter-carrier interference or the like is compensated by increasing the time diversity gain or coding gain obtained by applying HARQ, there is a case that the number of retransmission times abruptly increases. In HARQ, when the number of retransmitted packets increases, there is a problem that overhead in link capacity increases due to the retransmitted packets.

Further, in a single-carrier transmission scheme, in the case of applying an FDE (Frequency Domain Equalizer), when the propagation channel is time-varied largely between the beginning and the end in an FFT (Fast Fourier Transform) interval, packet errors occur due to the propagation channel estimation error, inter-carrier error and the like, and the same problem arises.

The present invention was made in view of such circumferences, and it is an object of the invention to provide a transmission apparatus, reception apparatus, communication system, transmission method and reception method for correcting data errors sufficiently and enabling desired transmission quality to be obtained, even when the time variation of fading is large in a multicarrier transmission scheme communication system to which HARQ is applied.

Means for Solving the Problem (1) To attain the above-mentioned object, the present invention took the following measures. In other words, a transmission apparatus of the invention is a transmission apparatus applied to a communication system in which the transmission apparatus and a reception apparatus perform automatic repeat request control therebetween, and is characterized by having a subcarrier spacing setting section that sets the subcarrier spacing used in transmitting a retransmission signal to be larger than the subcarrier spacing used in transmitting a first transmission signal, an IFFT section that performs IFFT (Inverse Fast Fourier Transform) on an input signal based on the subcarrier spacing set in the subcarrier spacing setting section, and a transmission section that transmits the first transmission signal and at least one retransmission signal.

Thus, the subcarrier spacing used in transmitting the retransmission signal is set to be larger than the subcarrier spacing used in transmitting the first transmission signal, and it is thereby possible to reduce the time variation in the propagation channel within a frame or symbol due to the time variation of fading. As a result, it is possible to suppress the propagation channel estimation error and inter-carrier interference in the retransmission, the quality of the retransmitted packet is improved, and it is possible to decrease the number of retransmission times.

(2) Further, in the transmission apparatus of the invention, the subcarrier spacing setting section is characterized by having a data arrangement setting section that arranges data by allocating data constituting a transmission signal to input points of the IFFT section at least one-point allocation intervals, while thinning output data from the IFFT section corresponding to the allocation intervals.

Thus, the data is arranged by allocating the data constituting a transmission signal to input points of the IFFT section at least one-point allocation intervals, while thinning the output data of the IFFT section corresponding to the allocation intervals, it is thereby possible to increase the subcarrier spacing in a retransmission signal with respect to the first transmission signal, resistance to the time variation in fading can be enhanced, and it is made possible to improve the quality of the retransmitted packet.

(3) Furthermore, in the transmission apparatus of the invention, the subcarrier spacing setting section is characterized by having a number-of-IFFT-point setting section that sets the number of points in the IFFT section.

Thus, the number of points of the IFFT section is set, it is thereby possible to increase the subcarrier spacing in a retransmission signal with respect to the first transmission signal, resistance to the time variation of fading can be enhanced, and it is made possible to improve the quality of the retransmitted packet.

(4) Still furthermore, the transmission apparatus of the invention is characterized by further having a data symbol generating section that generates the retransmission signal with the lower number of data symbols than in the first transmission signal.

Thus, by generating the retransmission signal with the lower number of data symbols than in the first transmission signal, it is possible to increase the subcarrier spacing with respect to the first transmission signal based on the generated retransmission signal. As a result, resistance to the time variation of fading is enhanced, and it is made possible to improve the quality of the retransmitted packet.

(5) Moreover, in the transmission apparatus of the invention, the data symbol generating section is characterized by having an error correcting coding section that adds redundant bits to information bits, and a puncturing section that thins more coded bits output from the error correcting coding section in the retransmission signal than in the first transmission signal.

Thus, more coded bits output from the error correcting coding section are thinned in the retransmission signal than in the first transmission signal, and it is thereby possible to decrease the number of coded bits or the number of modulated symbols (data symbols) in the retransmission with respect to the first transmission. By this means, the subcarrier spacing in the retransmission can be made larger than in the first transmission. As a result, resistance to the time variation of fading is enhanced, and it is made possible to improve the quality of the retransmitted packet.

(6) Further, in the transmission apparatus of the invention, the subcarrier spacing setting section is characterized by setting the subcarrier spacing based on the number of data symbols output from the data symbol generating section.

Thus, since the subcarrier spacing setting section sets the subcarrier spacing based on the number of data symbols output from the data symbol generating section, the retransmission signal is generated with the lower number of data symbols than in the first transmission signal, and it is thereby possible to make the subcarrier spacing larger than in the first transmission signal based on the generated retransmission signal. As a result, resistance to the time variation of fading is enhanced, and it is made possible to improve the quality of the retransmitted packet.

(7) Furthermore, the transmission apparatus of the invention is characterized by further having a GI adding section which sets a GI (Guard Interval) length so that an OFDM (Orthogonal Frequency Division Multiplexing) symbol length is constant based on a data arrangement pattern output from the subcarrier spacing setting section, and adds a GI based on the set GI length to generate a transmission signal.

Thus, since a GI is added to a transmission signal based on the GI length such that the OFDM symbol length is constant based on a data arrangement pattern output from the subcarrier spacing setting section, even when an effective symbol length is decreased by increasing the subcarrier spacing, it is possible to keep the total symbol length constant at each retransmission time.

(8) Further, a reception apparatus of the invention is a reception apparatus applied to a communication system in which a transmission apparatus and the reception apparatus perform automatic repeat request control therebetween, and is characterized by having a reception section that receives a first transmission signal and at least one retransmission signal from the transmission apparatus that is a communicating party, and an FFT section that performs FFT (Fast Fourier Transform) on a received signal based on the subcarrier spacing in the received signal received in the reception section.

Thus, since FFT is performed on a received signal based on the subcarrier spacing in the received signal, when the subcarrier spacing used in transmitting the retransmission signal is set to be larger than the subcarrier spacing used in transmitting the first transmission signal, it is possible to reduce the time variation in the propagation channel within a frame or symbol due to the time variation of fading. As a result, it is possible to suppress the propagation channel estimation error and inter-carrier interference in the retransmission, the quality of the retransmitted packet is improved, and it is possible to decrease the number of retransmission times.

(9) Furthermore, the reception apparatus of the invention is characterized by further having a signal detection section that performs demodulation processing on a plurality of first transmission signals or retransmission signals received in the reception section, a combining section that combines the first transmission signal or the retransmission signal that is a signal detected in the signal detection section, and a decoding section that performs decoding processing on the combined signal to obtain a result of the decoding processing.

Thus, a plurality of first transmission signals or retransmission signals is subjected to demodulation processing, the first transmission signal or the retransmission signal is combined, decoding processing is performed on the combined signal, and it is thereby possible to perform Hybrid-ARQ (HARQ).

(10) Moreover, a communication system of the invention is a communication system in which a transmission apparatus and a reception apparatus perform automatic repeat request control therebetween, and is characterized by being comprised of the transmission apparatus as described in any one of above-mentioned (1) to (7) and the reception apparatus as described in above-mentioned (8) or (9).

Thus, the subcarrier spacing used in transmitting the retransmission signal is set to be larger than the subcarrier spacing used in transmitting the first transmission signal, and it is thereby possible to reduce the time variation in the propagation channel within a frame or symbol due to the time variation of fading. As a result, it is possible to suppress the propagation channel estimation error and inter-carrier interference in the retransmission, the quality of the retransmitted packet is improved, and it is possible to decrease the number of retransmission times.

(11) Further, a transmission method of the invention is a transmission method in a transmission apparatus applied to a communication system in which the transmission apparatus and a reception apparatus perform automatic repeat request control therebetween, and is characterized by including at least the steps of setting, in a subcarrier spacing setting section, the subcarrier spacing used in transmitting a retransmission signal to be larger than the subcarrier spacing used in transmitting a first transmission signal, performing, in an IFFT section, IFFT on an input signal based on the subcarrier spacing set in the subcarrier spacing setting section, and transmitting, in a transmission section, the first transmission signal and at least one retransmission signal.

Thus, the subcarrier spacing used in transmitting the retransmission signal is set to be larger than the subcarrier spacing used in transmitting the first transmission signal, and it is thereby possible to reduce the time variation in the propagation channel within a frame or symbol due to the time variation of fading. As a result, it is possible to suppress the propagation channel estimation error and inter-carrier interference in the retransmission, the quality of the retransmitted packet is improved, and it is possible to decrease the number of retransmission times.

(12) Moreover, a reception method of the invention is a reception method in a reception apparatus applied to a communication system in which a transmission apparatus and the reception apparatus perform automatic repeat request control therebetween, and is characterized by including at least the steps of receiving, in a reception section, a first transmission signal and at least one retransmission signal from the transmission apparatus that is a communicating party, and performing, in an FFT section, FFT on a received signal based on the subcarrier spacing in the received signal received in the reception section.

Thus, since FFT is performed on a received signal based on the subcarrier spacing in the received signal, when the subcarrier spacing used in transmitting the retransmission signal is set to be larger than the subcarrier spacing used in transmitting the first transmission signal, it is possible to reduce the time variation in the propagation channel within a frame or symbol due to the time variation of fading. As a result, it is possible to suppress the propagation channel estimation error and inter-carrier interference in the retransmission, the quality of the retransmitted packet is improved, and it is possible to decrease the number of retransmission times.

ADVANTAGEOUS EFFECT OF THE INVENTION

According to the invention, in a multicarrier transmission scheme communication system for performing packet communications using Hybrid-ARQ (HARQ) obtained by combining Automatic Repeat reQuest (ARQ) and error correcting coding such as turbo coding, by increasing the subcarrier spacing by the number of retransmission times of a packet, even when the fading time variation is large, it is possible to obtain desired transmission quality. In other words, by making the subcarrier spacing larger in transmitting the retransmitted packet than in transmitting the first-transmitted packet, or by increasing the subcarrier spacing as the number of retransmission times increases, it is possible to reduce the time variation in the propagation channel within a frame or symbol due to the time variation of fading. As a result, it is possible to suppress the propagation channel estimation error and inter-carrier interference in the retransmission, the quality of the retransmitted packet is improved, and it is possible to decrease the number of retransmission times. Further, in addition thereto, although the effective symbol length is decreased by increasing the subcarrier spacing, by adding a GI length so that the total symbol length is constant at each retransmission time, it is also possible to enhance resistance to an extremely delayed version, while keeping a frame format constant in each retransmission, and further, it is possible to improve the quality of the retransmitted packet, and decrease the number of retransmission times.

BRIEF DESCRIPTION OF DRAWINGS

FIG. 4 is a diagram showing an example of puncture patterns when the error correcting coding section performs turbo coding of the coding rate R=⅓, and a puncture section performs puncturing processing of R=¾;

FIG. 15 is a diagram illustrating a rearrangement in a serial/parallel transform section, IFFT section, and parallel/serial transform section in the retransmission;

FIG. 16 is a block diagram illustrating a schematic configuration of a reception apparatus according to Embodiment 2; and FIG. 17 is a diagram illustrating a rearrangement in a serial/parallel transform section, FFT section, propagation channel compensation section, and parallel/serial transform section of the reception apparatus in the retransmission.

DESCRIPTION OF SYMBOLS

Figure 1:
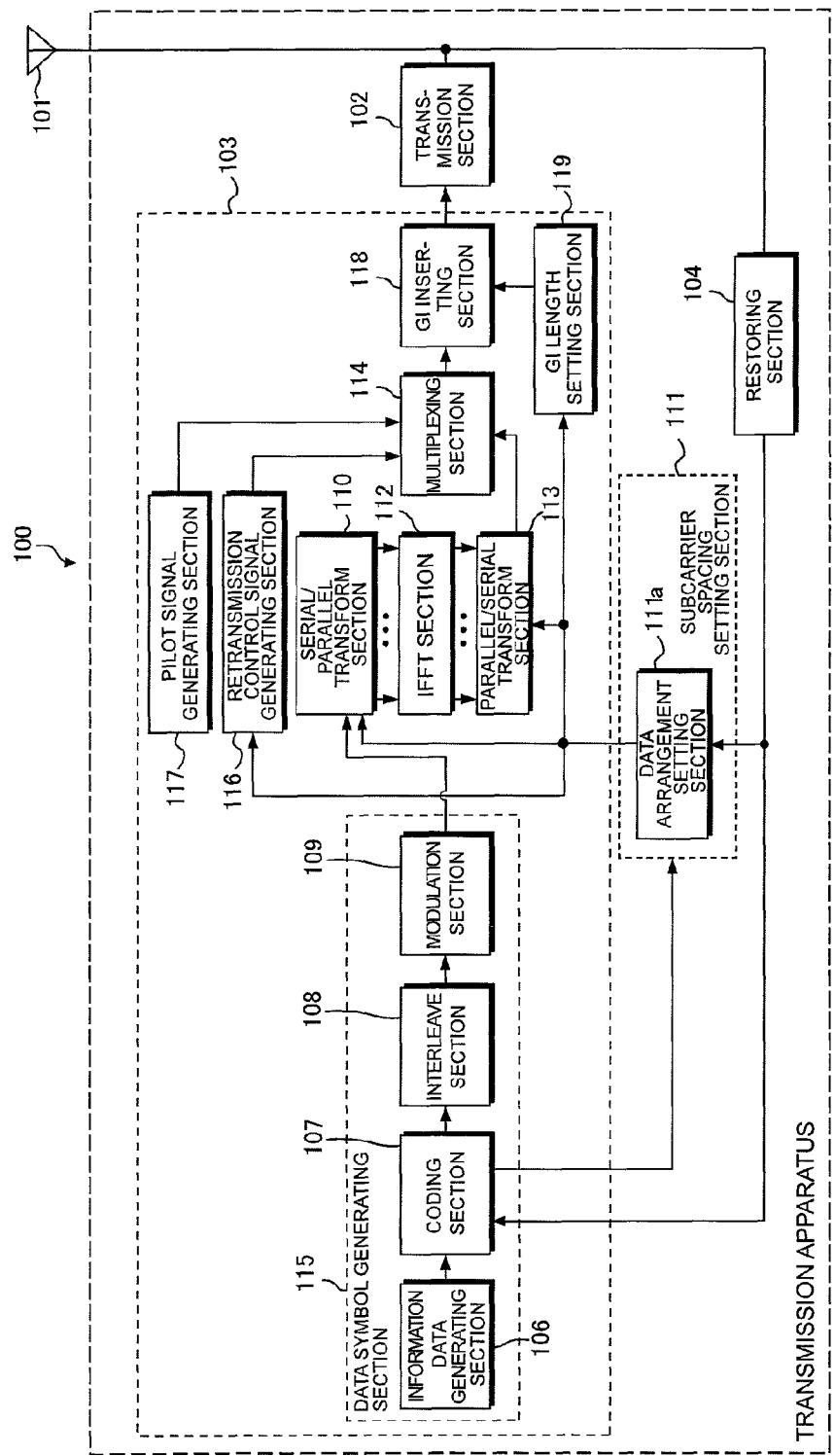
FIG. 1 is a block diagram illustrating a schematic configuration of a transmission apparatus 100 according to Embodiment 1 of the invention.

100 Transmission apparatus
101 Antenna
102 Transmission section
103 Transmission signal generating section
104 Restoring section
106 Information data generating section
107 Coding section
107a Error detecting coding section
107b Error correcting coding section
107c Puncture section
107d Transmission data storing section
108 Interleave section
109 Modulation section
110 Serial/parallel transform section
111 Subcarrier spacing setting section
111a Data arrangement setting section
112 IFFT section
113 Parallel/serial transform section
114 Multiplexing section
115 Data symbol generating section
116 Retransmission control signal generating section
117 Pilot signal generating section
118 GI inserting section 119 GI length setting section
130 Transmission apparatus
131 Subcarrier spacing setting section
131a Number-of-IFFT-point setting section
132 Serial/parallel transform section
133 IFFT section
134 Parallel/serial transform section
200 Reception apparatus
201 Antenna
202 Reception section
203 Control signal restoring section
204 Propagation channel estimation section
206 GI removing section
207 Serial/parallel transform section
208 FFT section
209 Propagation channel compensation section
210 Parallel/serial transform section
211 Demodulation section
212 Deinterleave section
213 Depuncture section
214 Combining section
216 Received signal storing section
217 Decoding section
217a Error correcting decoding section
217b Error detecting section
218 Acknowledgement signal generating section
219 Signal detection section
250 Reception apparatus
251 Control signal restoring section
252 Serial/parallel transform section
253 FFT section
254 Parallel/serial transform section
255 Signal detection section

BEST MODE FOR CARRYING OUT THE INVENTION

Embodiment 1

Embodiments according to the invention will be described below with reference to drawings. This Embodiment describes a transmission apparatus and reception apparatus for increasing the subcarrier spacing in a first-transmitted packet (first transmission signal) and retransmitted packet (retransmission signal) in an OFDM communication system for performing packet communications to which HARQ is applied. Shown herein are the transmission apparatus and reception apparatus which do not vary the number of FFT points in OFDM in the first-transmitted packet and retransmitted packet.

FIG. 1 is a block diagram illustrating a schematic configuration of a transmission apparatus 100 according to Embodiment 1 of the invention. For example, the transmission apparatus 100 is provided in a base station or relay station on the downlink, and in a mobile station on the uplink, in a radio communication system. In FIG. 1, an antenna 101 receives a signal including an acknowledgement signal from the reception apparatus. Further, the antenna 101 transmits a signal generated in the transmission apparatus 100.

A transmission section 102 converts an output signal from a transmission signal generating section 103 into an analog signal (D/A conversion), performs filtering processing to limit the band, and further, converts the signal into a signal with a transmissible frequency band. A restoring section 104 converts a signal from the reception apparatus received from the antenna 101 into a signal with a frequency band enabling restoring processing, performs filtering processing to limit the band, converts the analog signal into a digital signal (A/D conversion), further performs reception signal restoring processing such as data demodulation and error correcting decoding on the digital signal, and extracts an acknowledgement signal included in the signal from the reception apparatus. In addition, the restoring section 104 has the function of processing a received signal to restore based on a transmission scheme of the received signal. The acknowledgement signal is a signal for acknowledging transmission and signal including information of whether or not to request retransmission. For example, there are an ACK/(ACKnowledge)/NACK (Negative ACKnowledge) signal and the like. When the reception side cannot correctly receive a packet transmitted from the transmission side, the reception side sends an NACK signal back to the transmission side, while sending an ACK signal back to the transmission side when correctly receiving the packet. Further, as a signal for the reception side to send back to the transmission side with respect to a signal that can be received correctly, there is also a Selective ACK signal.

The information data generated in an information data generating section 106 is input to a coding section 107. The coding section 107 adds redundant bits to the information data to enable the reception apparatus that receives the input information data to perform error detection and error correction.

Figure 2:
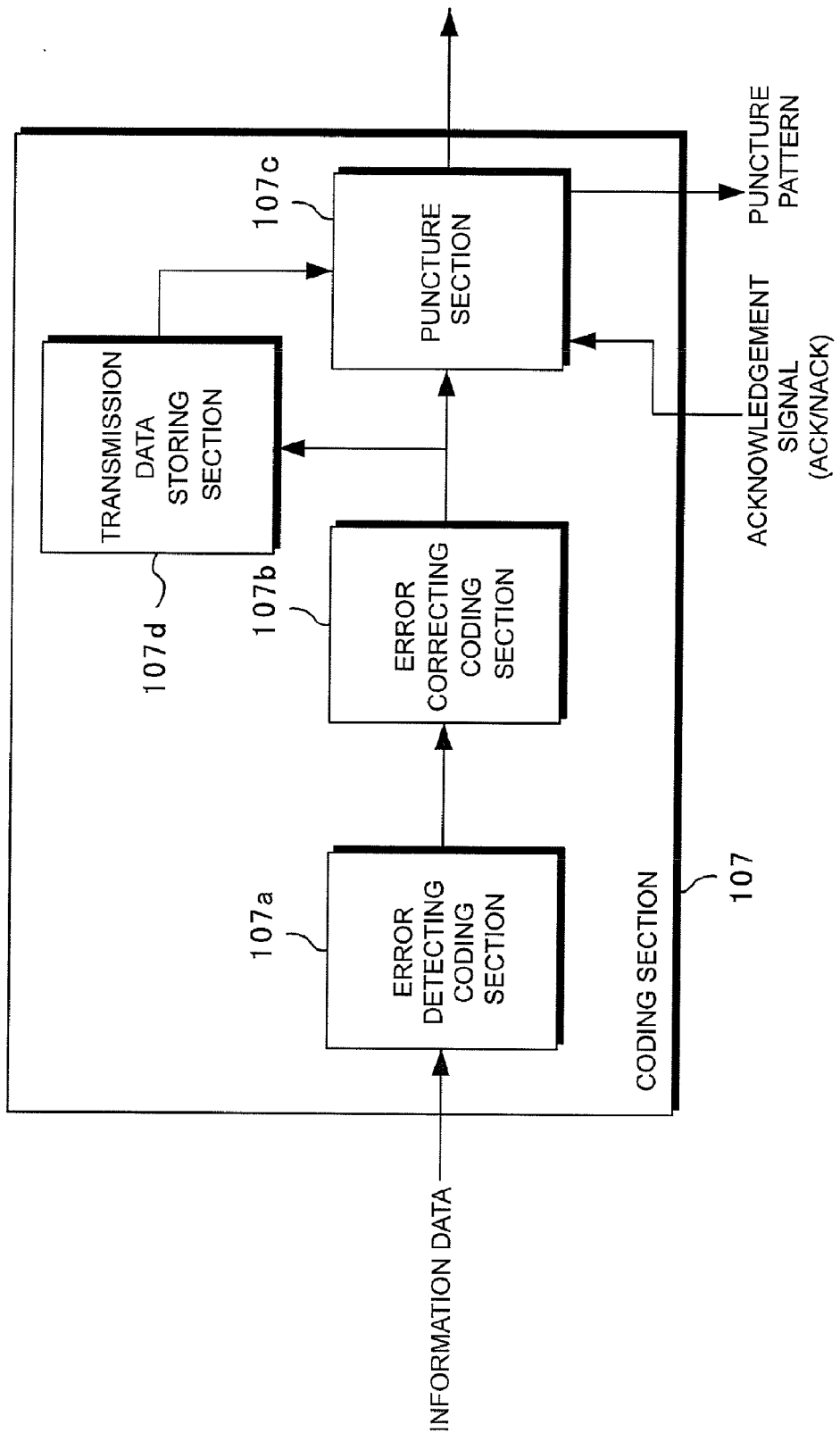
FIG. 2 is a block diagram illustrating a schematic configuration of a coding section.

FIG. 2 is a block diagram illustrating a schematic configuration of the coding section 107. The coding section 107 is comprised of an error detecting coding section 107a, error correcting coding section 107b, puncture section 107c, and transmission data storing section 107d. The error detecting coding section 107a performs error detecting coding such as CRC (Cyclic Redundancy Check) to enable the reception apparatus receiving the input information data to detect whether or not an error exists. The error correcting coding section 107b performs error correcting coding such as turbo code and convolutional code on the data output from the error detecting coding section 107a. In this Embodiment, it is assumed that a data unit to perform error detecting coding is a packet, and error correcting coding is performed on a packet-by-packet basis.

The puncture section 107c performs thinning (called the puncturing processing) on coded data output from the error correcting coding section 107b based on a held predetermined pattern, and decreases the data amount to transmit. Further, when a NACK signal is input, the puncture section 107c performs the puncturing processing again based on the predetermined pattern.

The transmission data storing section 107d stores the coded data generated in the error correcting coding section 107b, and outputs the stored coded data when the puncture section 107c requests the data. When the puncturing processing is required again, the puncture section 107c requests the transmission data storing section 107d to output the data. When a NACK signal is received as an acknowledgement signal, the puncture section 107c requests the transmission data storing section 107d to output the data. In addition, it is also possible to input the NACK signal to the transmission data storing section.

Figure 3:
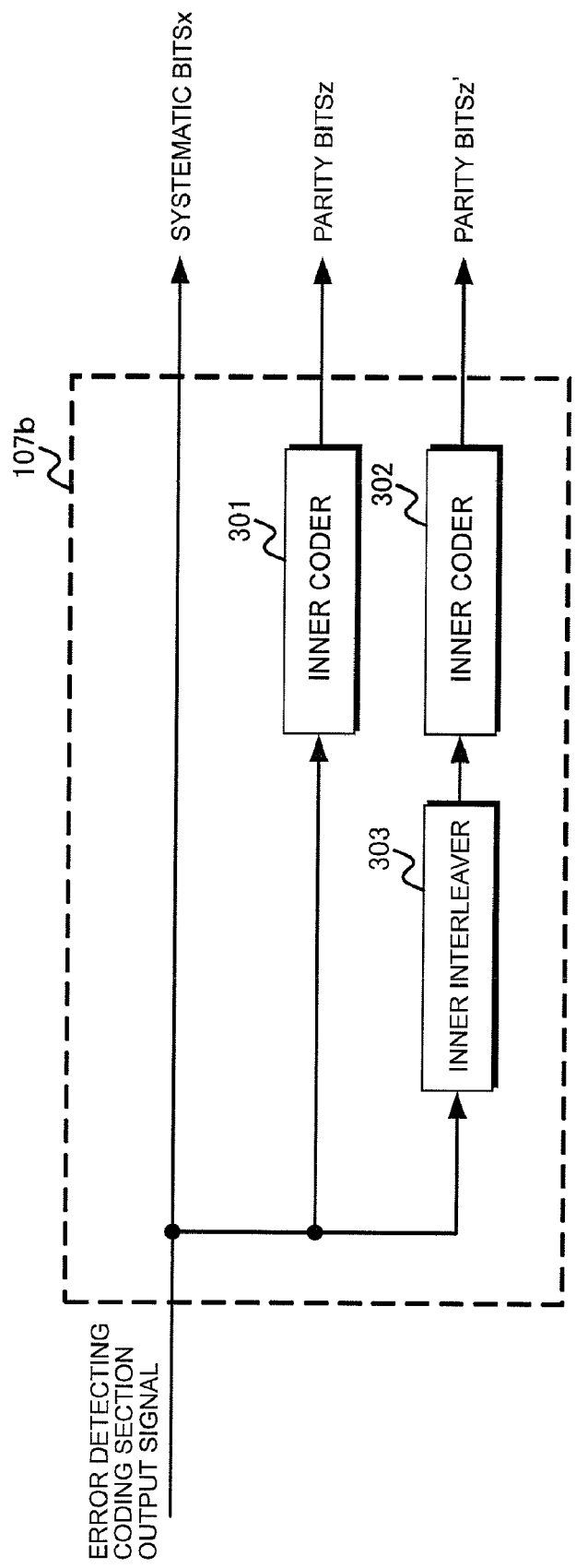
FIG. 3 is a diagram showing an example of a configuration diagram of a turbo coder for performing turbo coding of a coding rate R=⅓ as an error correcting coding section 107b.

FIG. 3 is a diagram showing an example of a configuration diagram of a turbo coder for performing turbo coding of a coding rate R=⅓ as the error correcting coding section 107b. The error correcting coding section 107b has inner coders 310 and 302, and inner interleaver 303. When an information bit sequence subjected to error detecting coding is input from the error detecting coding section 107a, the error correcting coding section 107b outputs three kinds of information bit sequences of systematic parity bits x, parity bits z, and parity bits z'. Herein, the systematic parity bits x are the bit sequence input from the error detecting coding section 107a. The parity bits z are an output result obtained by the inner coder 301 performing coding processing on the bit sequence from the error detecting coding section 107a. The parity bits z' are an output result obtained by the inner interleaver 303 first performing interleaving processing on the bit sequence from the error detecting coding section 107a and the inner coder 302, to which the result of the interleaving processing is input, performing coding processing. Herein, the inner coders 301 and 302 may be similar coders for performing the same coding scheme coding, or different coders. Preferably, a recursive convolutional coder is used for both of the inner coders 301 and 302. Thereafter, the error correcting coding section 107b is described in the case that the section 107b has the configuration as shown in FIG. 3 and uses turbo code.

As the predetermined pattern in the puncturing processing, there are CC (Chase Combining), IR (Incremental Redundancy), etc. FIG. 4 is a diagram showing an example of puncture patterns when the error correcting coding section 107b performs turbo coding of the coding rate R=⅓, and the puncture section 107c performs puncturing processing of R=¾. In FIG. 4, x represents data input to the error correcting coding section 107b from the error detecting coding section 107a that performs error detecting coding on the information data from the information data generating section 106, and the data output without any processing (also referred to as the systematic bits). z and z' represent redundant bits (parity bits) generated from the systematic bits in the error correcting coding section 107b, and the error correcting coding section 107b inputs the coded data x, z, z' to the transmission data storing section 107d and puncture section 107c.

When CC is applied as HARQ, the puncture section 107c performs the puncturing processing on data (data of a first-transmitted packet signal) of a packet signal to first transmit, for example, according to pattern 1 shown in FIG. 4, and outputs only bits shown by [1] in FIG. 4. Further, when a NACK signal is input (retransmission is requested) as an acknowledgement signal in response to the first-transmitted packet signal, the puncture section 107c reads out the coded data stored in the transmission data storing section 107d, and outputs a signal subjected to the puncturing processing with the same pattern 1 as in the first-transmitted packet signal.

The puncture section 107c continues to output the signal that is punctured with the same pattern as in the first-transmitted packet signal until ACK is input. When ACK is input, the puncture section 107c performs the puncturing processing on output data from the error correcting coding section 107b that is different from the data of the signal transmitted in the first-transmitted packet based on pattern 1, pattern 2 or pattern 3. When IR is applied as HARQ, the puncture section 107c performs the puncturing processing on data (data of a first-transmitted packet signal) of a packet signal to first transmit according to pattern 1 shown in FIG. 4, and outputs only bits shown by [1] in FIG. 4.

Next, when a NACK signal is input (first retransmission is requested) as an acknowledgement signal in response to the first-transmitted packet signal, the puncture section 107c reads out the coded data of R=⅓ from the transmission data storing section 107d, and outputs a signal subjected to the puncturing processing with pattern 2. Further, when second retransmission is requested, the puncture section 107c reads out the coded data of R=⅓ from the transmission data storing section 107d, and outputs a signal subjected to the puncturing processing with pattern 3. Furthermore, when third retransmission is requested, the puncture section 107c outputs a signal subjected to the puncturing processing again with pattern 1. Until ACK is input, the puncture section 107c continues to output signals punctured with pattern 1, pattern 2 or pattern 3 repeatedly. When ACK is input, the puncture section 107c performs the puncturing processing on output data from the error correcting coding section 107b that is different from the data in the first-transmitted signal based on pattern 1.

In addition, in the above-mentioned description, described is an example of repeating patterns 1 to 3 sequentially, but the order of the pattern is not limited thereto. Further, all the patterns may not be used. Furthermore, in the case that the predetermined number of retransmission times is met, even when a NACK signal is input, it is possible to halt the retransmission.

In FIG. 1, an interleave section 108 rearranges an arrangement of the output data sequence of the coding section 107. A modulation section 109 performs data modulation such as QPSK and 16 QAM on the output data from the interleave section 108, and generates modulated symbols. A serial/parallel transform section 110 rearranges the modulated symbol sequence from the modulation section 109 into parallel according to a data arrangement pattern from a subcarrier spacing setting section 111. An IFFT section 112 performs frequency/time transform on the output signal from the serial/parallel transform section 110 by IFFT (Inverse Fourier Transform) or the like. A parallel/serial transform section 113 rearranges the output signal from the IFFT section 112 into a series according to a data arrangement pattern from the subcarrier spacing setting section 111. A multiplexing section 114 multiplexes the signal output from the parallel/serial transform section 113, a retransmission control signal generated in a retransmission control signal generating section 116, and a pilot signal generated in a pilot signal generating section 117. The multiplexing method includes time multiplexing and frequency multiplexing, and is any method enabling the reception apparatus to restore the retransmission control signal.

The retransmission control signal generating section 116 generates the control signal indicating signal processing parameters including the number of retransmission times of the data signal that the transmission section 102 transmits, information indicating the subcarrier spacing such as a data arrangement, a GI length, data modulation scheme and the like that the transmission source performs on the data signal. The control signal is only required to include the signal processing parameters necessary for the reception apparatus to restore the data signal. The pilot signal generating section 117 generates the pilot signal used in propagation channel estimation. A GI inserting section 118 inserts a GI (Guard Interval) with a length set in a GI length setting section 119 in the signal output from the parallel/serial transform section 113 to output to the transmission section 102. The GI length setting section 119 sets the GI length based on the data arrangement pattern from the subcarrier spacing setting section 111.

The subcarrier spacing setting section 111 has a data arrangement setting section 111a. When a NACK signal is input from the restoring section 104, the data arrangement setting section 111a acquires the number-of-bit information in the puncturing processing of data to next retransmit from the coding section 107, and based on the number-of-bit information, sets a data arrangement. For example, in the puncture patterns in FIG. 4, the number-of-bit information of pattern 1 is "8", the number-of-bit information of pattern 2 is "4", and the number-of-bit information of pattern 3 is "4". In other words, when the puncturing processing is performed based on pattern 1 in the first transmission, and is performed based on pattern 2 or 3 in the retransmission, it is possible to decrease the number of data items in the retransmission from the number of data items in the first transmission.

Figure 5:
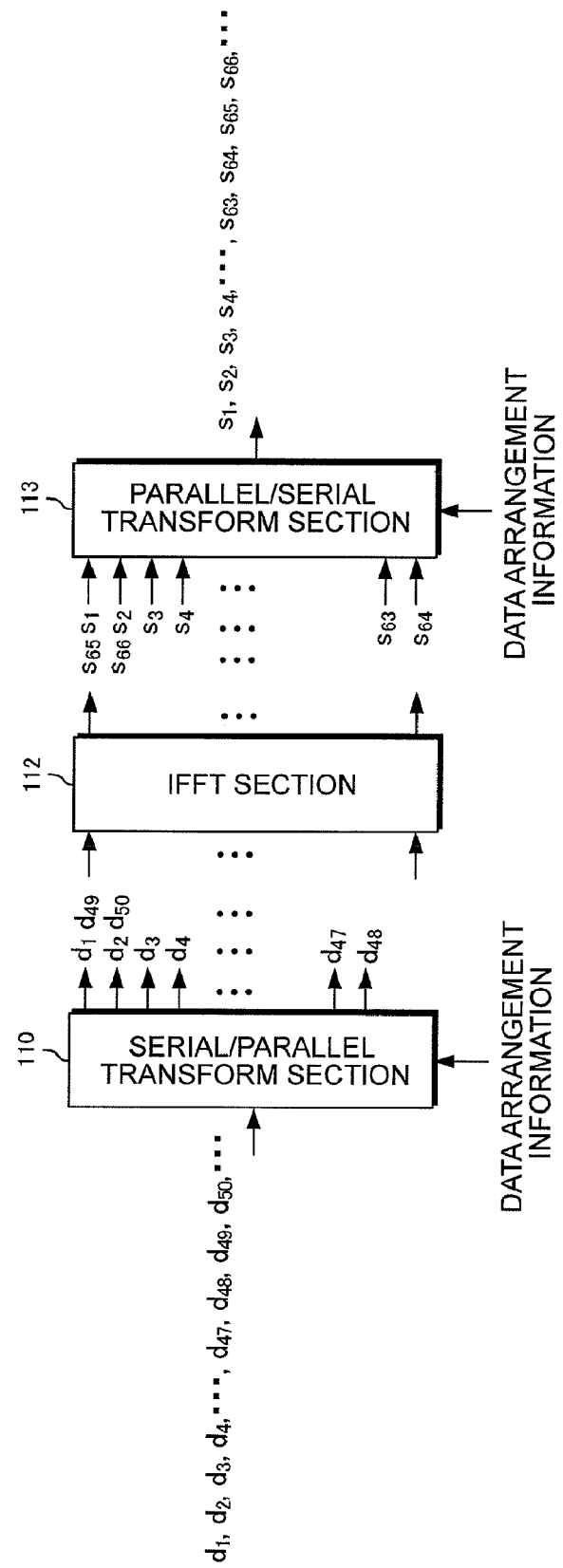
FIG. 5 is a diagram schematically showing input and output signals in a serial/parallel transform section, IFFT section and parallel/serial transform section.
Figure 6:
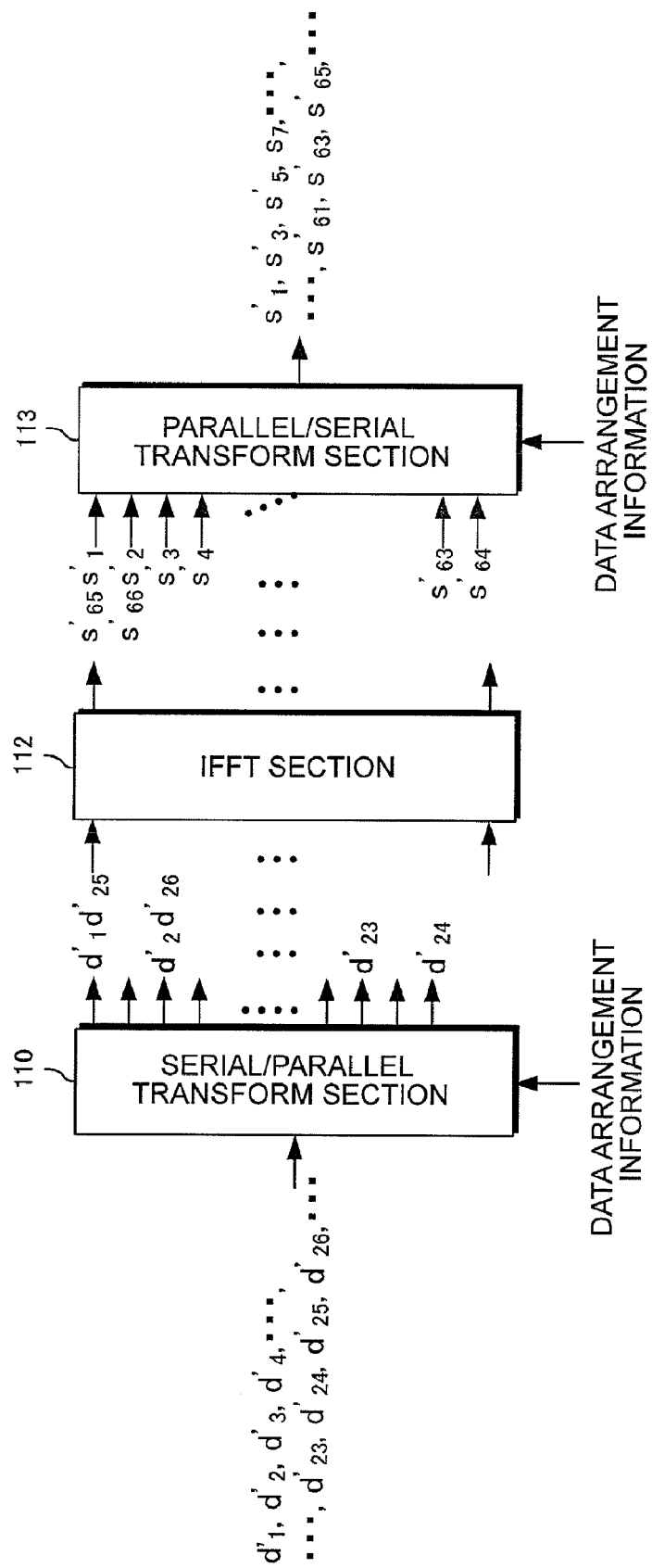
FIG. 6 is another diagram schematically showing input and output signals in the serial/parallel transform section, IFFT section and parallel/serial transform section.

FIGS. 5 and 6 are diagrams schematically showing input and output signals in the serial/parallel transform section 110, IFFT section 112 and parallel/serial transform section 113, and FIG. 5 illustrates a rearrangement in the serial/parallel transform section 110 and parallel/serial transform section 113 using data arrangement information set in the data arrangement setting section 111a in the first transmission. Further, FIG. 6 illustrates a rearrangement in the serial/parallel transform section 110 and parallel/serial transform section 113 in the retransmission. FIGS. 5 and 6 show an example in an OFDM transmission apparatus where the number of points in the IFFT section 112 is "64", the number of subcarriers is "48", the error correcting coding section 107b performs coding of R=⅓, the puncture section 107c performs the puncturing processing based on pattern 1 in the first transmission, while performing the puncturing processing based on pattern 2 in the retransmission, and a modulation scheme in the modulation section 109 is QPSK. In addition, the number of subcarriers is set depending on the band of a guard band set to reduce interference to adjacent channels.

As shown in FIG. 5, it is assumed in the first transmission that a modulated symbol sequence output from the modulation section 109 is d=(d1, d2, d3, . . . , d48, d49, d50, . . . ), and that an output from the IFFT section 112 is s=(s1,s2,s3, . . . , s64,s65,s66, . . . ). In the first transmission, the data arrangement setting section 111a inputs arrangement information for assigning the modulated symbol sequence to input points of IFFT sequentially in parallel to the serial/parallel transform section 110 as the data arrangement information, and the serial/parallel transform section 110 rearranges the sequence into parallel using the number of subcarriers as a unit according to the arrangement information. The parallel/serial transform section 113 acquires the data arrangement information as in the serial/parallel transform section 110 from the data arrangement setting section 111a, and rearranges signals output in parallel from the IFFT section 112 for each of the number of IFFT points to a series.

It is shown in the retransmission that a modulated symbol sequence output from the modulation section 109 is d'=(d'1, d'2, . . . , d'24,d'25,d'26, . . . ), and that an output from the IFFT section 112 is s'=(s'1,s'2,s'3, . . . , s'64,s'65,s'66, . . . ). In the retransmission, the data arrangement setting section 111a inputs arrangement information for assigning the modulated symbol sequence to every two input points of IFFT to the serial/parallel transform section 110 as the data arrangement information, and the serial/parallel transform section 110 rearranges the sequence into parallel using the number of subcarriers as a unit according to the arrangement information. The parallel/serial transform section 113 acquires the data arrangement information as in the serial/parallel transform section 110 from the data arrangement setting section 111a, thins one every two signals output in parallel from the IFFT section 112 for each of the number of IFFT points to rearrange into a series.

The modulated symbol sequence d in the first transmission and the modulated symbol sequence d' in the retransmission are modulated symbol sequences generated by performing data mapping by QPSK on the signal xc or x' c obtained by performing error correcting coding and puncturing processing on the data x=(x1,x2,x3 . . . , x72,x73,x74, . . . ) from the error detecting coding section 107a. In addition, xc=(x1,z1, x2,x3,x4,z'4,x5,x6,x7,z7,x8,x9,x10,z'10,x11,x12, . . . , x72, x73,z74 . . . ) is the data in the first transmission punctured using pattern 1, and x'c=(z'1,z'2,z4,z5,z'7,z'8,z10,z11, . . . , z'67,z'68,z70,z71,z'73,z'74 . . . ) is the data in the retransmission punctured using pattern 2.

Further, the modulated symbol sequences d, d' are subjected to QPSK modulation by paring components forming xc or x'c such as (d1,d2,d3, . . . )=((x1,z1), (x2,x3), (x4, z'4) . . . ) and (d'1,d'2,d'3 . . . )=((z'1,z'2),(z'4,z'5),(z'7, z'8) . . . ), assigning the amplitude and phase based on each pair. In addition, the d, d' are an example in the case that the interleave section 108 outputs the data in the same arrangement as in input, and the modulation section 109 assigns the amplitude and phase to the output data of the interleave section 108.

For example, when 144 items of data x are input to the error correcting coding section 107b, the puncture section 107c outputs the data in xc=192 (items) and x'c=96 (items), and the modulation section 109 outputs modulated symbols in d=96 (symbols) and d'=48 (symbols). Accordingly, by the puncture section 107c making the number of coded bits half that of the first transmission, in the retransmission, it is possible to assign modulated symbols every two input points of IFFT, without reducing the number of information data items. As described above, the number of coded bits or the number of modulated symbols (the number of data symbols) is decreased in the retransmission with respect to the first transmission, data assignment to the IFFT section 112 is performed in consideration of decreases in the number of coded bits or the number of modulated symbols, and the subcarrier spacing is thereby increased. In addition, the information data generating section 106, coding section 107, interleave section 108, and modulation section 109 are called the data symbol generating section 115. In addition, in the foregoing, the data input to the IFFT section 112 is decreased by using the puncture patterns for reducing bits output from the puncture section 107c in the retransmission with respect to the first transmission, but can be decreased by increasing the modulation level in the modulation section 109. For example, by modulating by QPSK in the first transmission, while using 16 QAM in the retransmission, it is possible to make the number of data items input to the IFFT section 112 half.

In addition, the data arrangement setting section 111a is also capable of beforehand determining data arrangements in the transmission of a first-transmitted packet and in the transmission of a retransmitted packet without using the number-of-bit information. For example, the data arrangement setting section 111a has a table storing arrangement information for assigning the modulated symbol sequence to input points of IFFT sequentially in parallel in transmitting a first-transmitted packet, and further storing arrangement information for assigning the modulated symbol sequence to one every two input points of IFFT in the retransmission, and inputs the assignment arrangement information of the modulated symbol sequence of the transmission of a first-transmitted packet to the serial/parallel transform section 110 and parallel/serial transform section 113 when an input acknowledgement signal is ACK, while inputting the assignment arrangement information of the transmission of a retransmitted packet to the serial/parallel transform section 110 and parallel/serial trans form section 113 when the acknowledgement signal is NACK. As described above, by increasing the subcarrier spacing, resistance to the time variation in fading is enhanced, and it is possible to improve the quality of the retransmitted packet.

Figure 7:
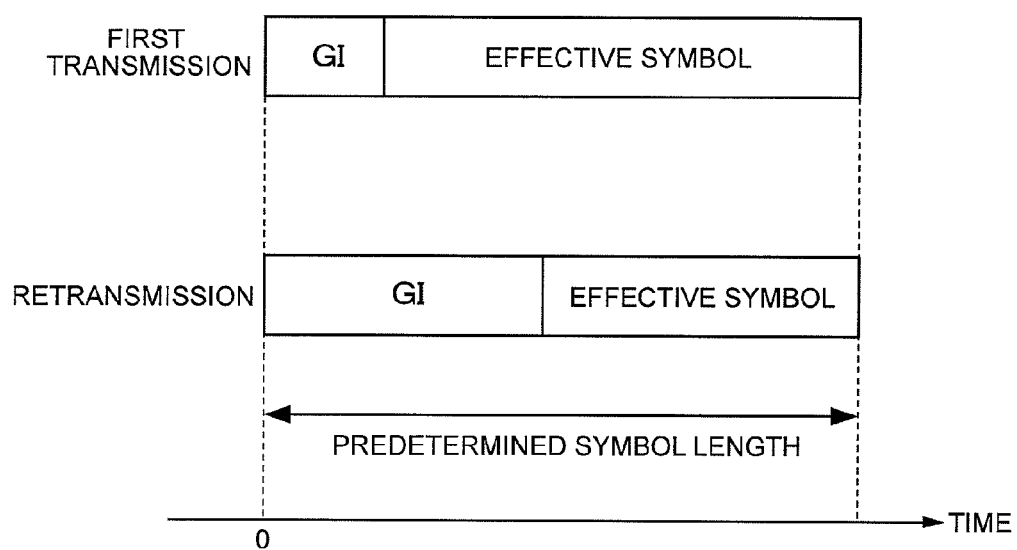
FIG. 7 is a diagram showing an example of setting of a GI length in a GI length setting section.

FIG. 7 is a diagram showing an example of setting a GI length in the GI length setting section 119. The effective symbol length is varied in the retransmission with respect to the first transmission due to the output s, s' of the parallel/serial transform section 113 in the first transmission or retransmission as shown in FIGS. 5 and 6. By thinning one every two signals output in parallel from the IFFT section 112 for each of the number of IFFT points, the effective symbol length is shortened. Accordingly, the GI length setting section 119 calculates an effective symbol length from the data arrangement information from the carrier spacing setting section 111, and sets the GI length so as to obtain a beforehand set predetermined OFDM symbol length. The GI inserting section 118 adds a GI with the set length to an effective symbol. The GI inserting section 118 and GI length setting section 119 constitute the GI adding section.

The GI is a copy (cyclic prefix) of a latter half of the effective symbol, zero padding and the like. As described above, by adding a GI length, in addition to the time variation of fading, resistance is enhanced even to the extremely delayed version, and it is possible to improve the data quality of a retransmitted packet. Further, it is possible to make the OFDM symbol length constant in the first transmission and retransmission, and as a result, it is also possible to make the transmission packet length and frame length constant. In addition, in this Embodiment, the GI length is varied, but the GI length may be made constant, and the significant effect is not given to resistance to the time variation of fading.

Figure 8:
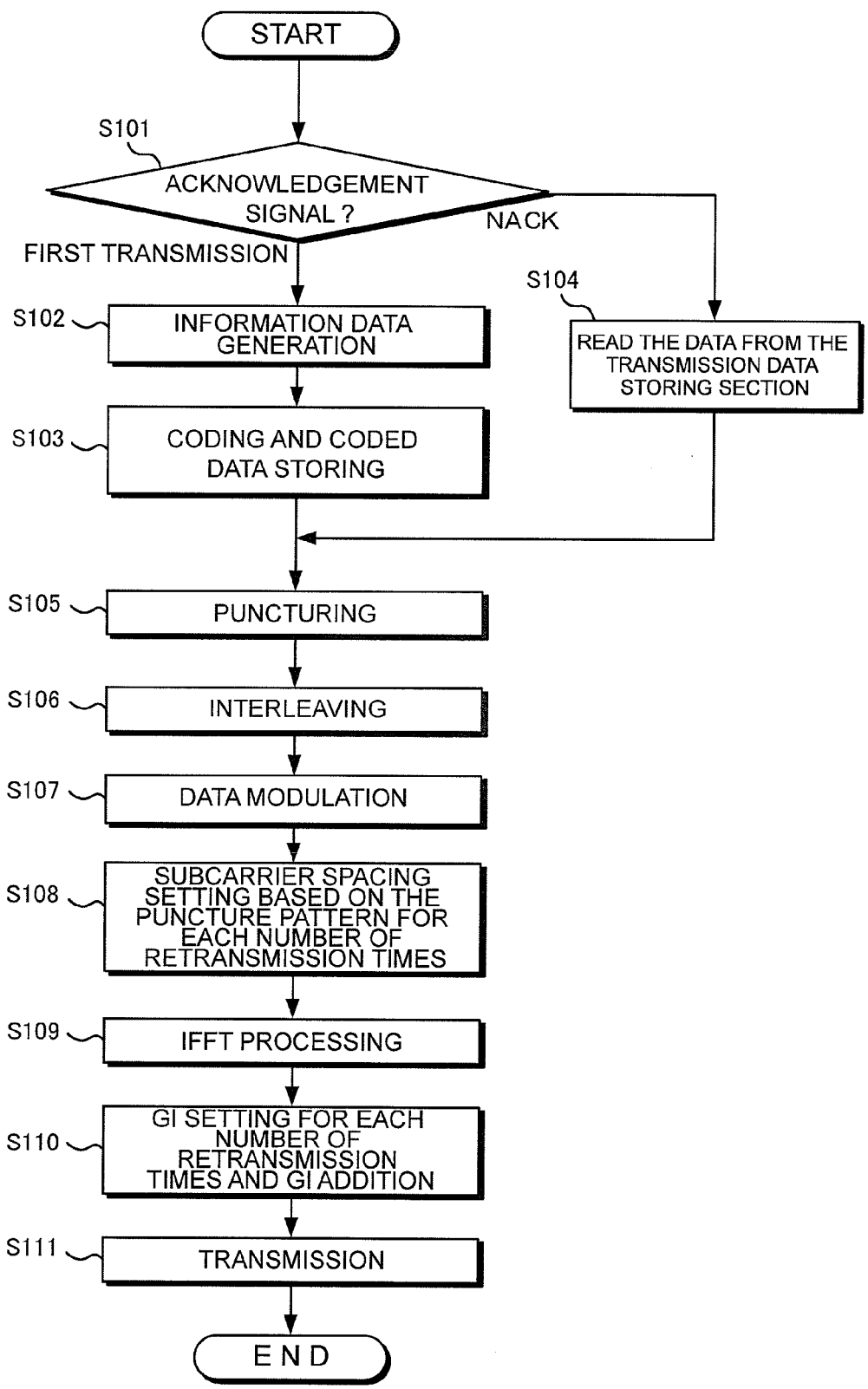
FIG. 8 is a flowchart illustrating the operation of the transmission apparatus according to Embodiment 1.

FIG. 8 is a flowchart illustrating the operation of the transmission apparatus according to this Embodiment. First, the apparatus judges the status of an acknowledgement signal (S101). In the case of transmitting new data when an ACK signal is received or the like, the information data generating section 106 generates information data (S102). The coding section 107 performs error detecting coding and error correcting coding on the information data to output to the puncture section 107c, and the error correcting coded data is stored (S103). Meanwhile, in step 5101, when a NACK signal is received, the data stored in the transmission data storing section 107d is read to output to the puncture section 107c (S104). The puncture section 107c performs the puncturing processing using a respective puncture pattern for each transmission time (depending on a signal of the first transmission or retransmission in what number of times) (S105).

The punctured signal is subjected to the interleaving processing (S106) and data modulation processing (S107), and then, according to the puncture pattern, the subcarrier spacing is set (S108). The serial/parallel trans form section 110 assigns modulated symbols to IFFT inputs so as to obtain the set subcarrier spacing, the IFFT section 112 performs frequency/time transform according to the assignment, and further, the parallel/serial transform section 113 selects (thins) IFFT output signals (S109). Finally, the GI length is set for each retransmission based on the transmission data, a GI with the set length is added to an effective symbol (S110), the transmission section converts the signal into a signal with a transmissible frequency band, and the signal is transmitted from the antenna (S111).

Figure 9:
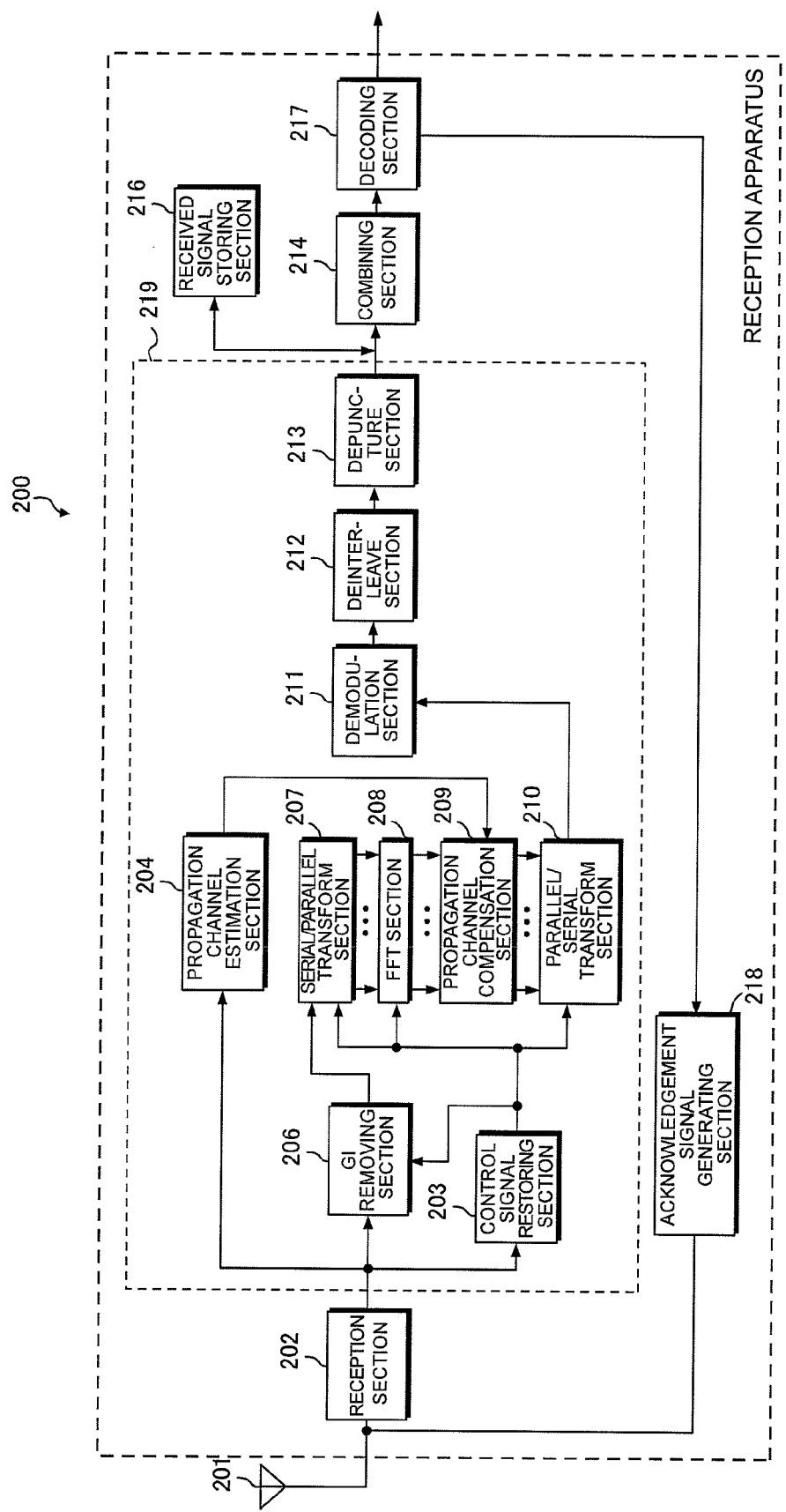
FIG. 9 is a block diagram illustrating a schematic configuration of a reception apparatus according to Embodiment 1.

FIG. 9 is a block diagram illustrating a schematic configuration of a reception apparatus according to this Embodiment. A reception apparatus 200 is provided in a mobile station on the downlink, and in abase station and relay station on the uplink, in a radio communication system. An antenna 201 receives a signal transmitted from the transmission apparatus, while transmitting a signal including an acknowledgement signal generated in the reception apparatus 200. A reception section 202 performs conversion into a signal with a frequency band enabling signal processing such as signal detection processing and filtering processing to limit the band on the signal from the transmission apparatus received from the antenna 201, and converts the analog signal into a digital signal (A/D conversion). A control signal restoring section 203 restores a control signal included in the output signal of the reception section 202. A propagation channel estimation section 204 performs propagation channel estimation using a pilot signal included in the output signal of the reception section 202. In addition, in this Embodiment, propagation channel estimation is performed using a pilot signal, but a known signal such as a preamble and control signal can be used. A GI removing section 206 removes a GI of the data signal based on the control signal indicative of the GI length from the control signal restoring section 203.

A serial/parallel transform section 207 rearranges the output signal from the GI removing section 206 to parallel in the same data assignment as that the transmission source apparatus performs, based on the control signal indicating a data arrangement pattern acquired from the control signal restoring section 203. An FFT section 208 performs frequency/time transform on the output signal from the serial/parallel transform section 207 by FFT (Fast Fourier Transform) or the like. A propagation channel compensation section 209 calculates a weight coefficient for correcting propagation channel distortion by ZF (Zero Forcing), MMSE (Minimum Mean Square Error) or the like, using the propagation channel estimation result from the propagation channel estimation section 204, and multiplies the weight coefficient by the output signal from the FFT section 208. A parallel/serial transform section 210 rearranges the output signal from the propagation channel compensation section 209 to a series in the same data assignment as that the transmission apparatus (transmission source) performs, based on the control signal indicative of a data arrangement pattern acquired from the control signal restoring section 203.

Figure 10:
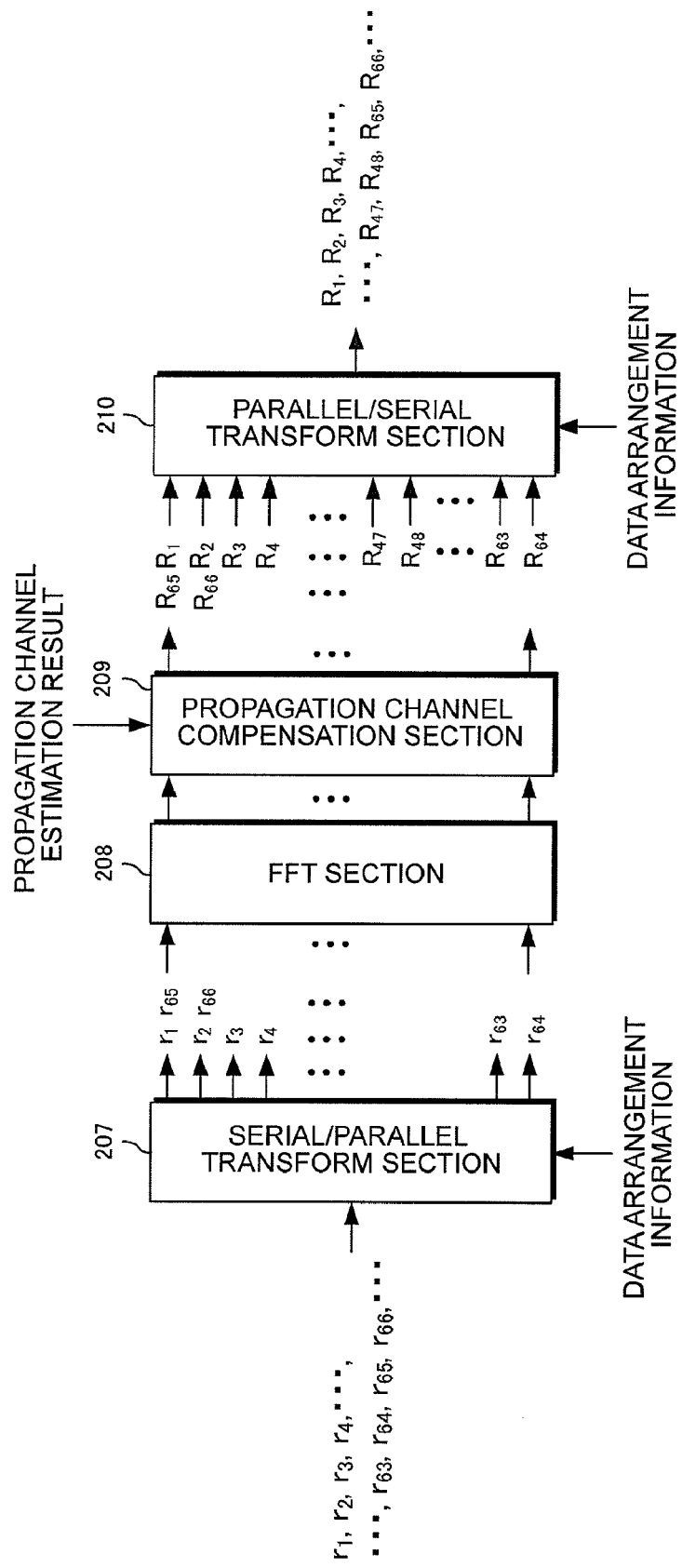
FIG. 10 is a diagram illustrating a rearrangement in a serial/parallel transform section, FFT section, propagation channel compensation section, and parallel/serial transform section of the reception apparatus in the first transmission.
Figure 11:
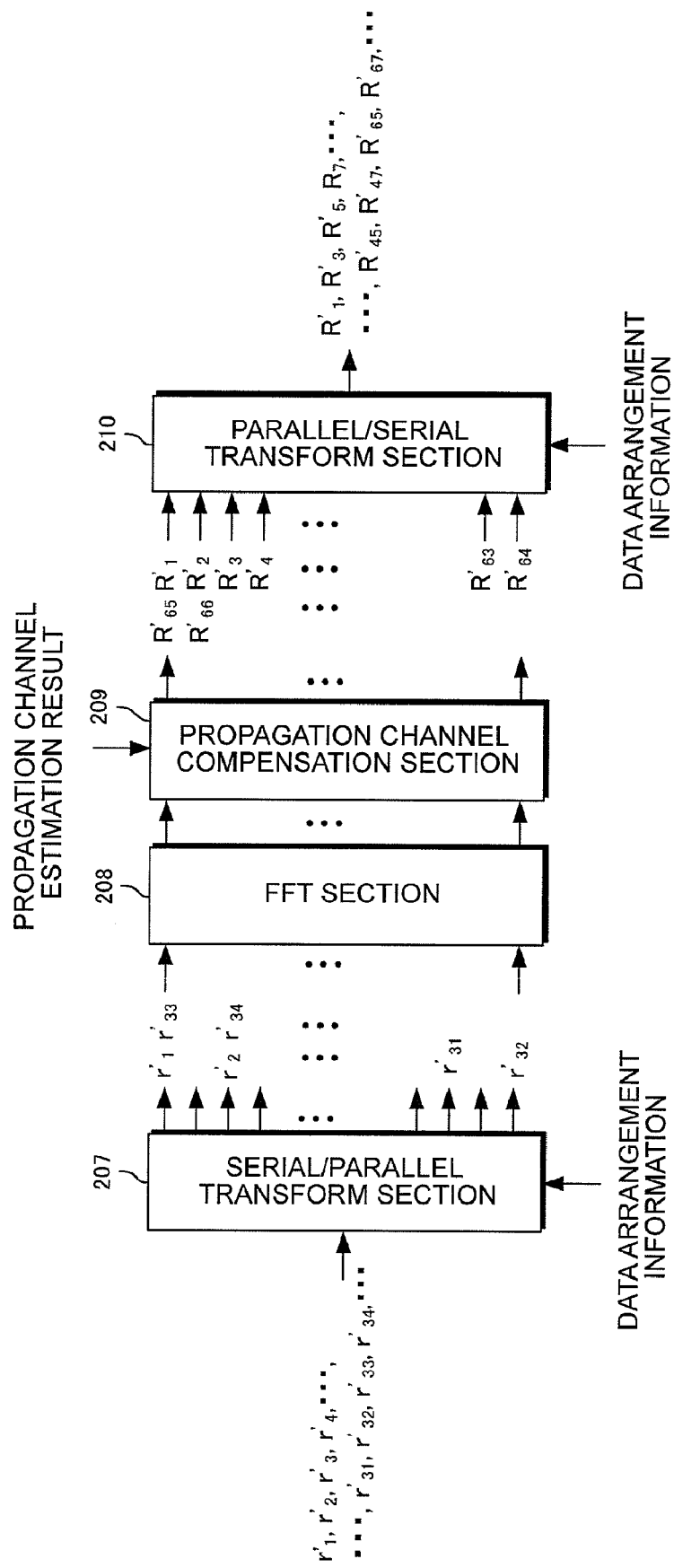
FIG. 11 is a diagram illustrating a rearrangement in the serial/parallel transform section, FFT section, propagation channel compensation section, and parallel/serial transform section of the reception apparatus in the retransmission.

FIG. 10 is a diagram illustrating a rearrangement in the serial/parallel transform section 207, FFT section 208, propagation channel compensation section 209, and parallel/serial transform section 210 of the reception apparatus in the first transmission. Further, FIG. 11 is a diagram illustrating a rearrangement in the serial/parallel transform section 207, FFT section 208, propagation channel compensation section 209, and parallel/serial transform section 210 of the reception apparatus in the retransmission. FIGS. 10 and 11 are assumed to show the OFDM system reception apparatus set in the same way as in FIGS. 5 and 6.

It is assumed in the first transmission that a received signal sequence output from the GI removing section 206 is r=(r1, r2,r3, . . . , r64,r65,r66, . . . ), and that an output from the propagation channel compensation section 209 is R=(R1,R2, R3, . . . , R64,R65,R66, . . . ). In the first transmission, when a data arrangement pattern in the first transmission is identified by the number of retransmission times or the arrangement information indicative of a data arrangement pattern such as the subcarrier spacing from the control signal restoring section 203, the received signal sequence r is rearranged sequentially to parallel using the number of FFT points as a unit, according to the data arrangement pattern.

The parallel/serial transform section 210 acquires the control signal as in the serial/parallel transform section 207, and sequentially rearranges data (data corresponding to points to which subcarriers are allocated) corresponding to points to which data is assigned in the IFFT section 112 in the transmission source apparatus into a series, among signals output in parallel from the propagation channel compensation section 209 for each of the number of IFFT points.

Meanwhile, it is shown in the retransmission that a received signal sequence output from the GI removing section 206 is r'=(r'1,r'2, . . . , r'32,r'33,r'34, . . . ), and that an output from the propagation channel compensation section 209 is R'=(R'1,R'2,R'3, . . . , R'64,R'65,R'66, . . . ). In the retransmission, when a data arrangement pattern is identified by the number of retransmission times or the arrangement information indicative of a data arrangement pattern such as the subcarrier spacing from the control signal restoring section 203, the received signal sequence r' is rearranged into parallel using the number of FFT points as a unit according to the data arrangement pattern, so as to assign every two input points of the FFT section 208. The parallel/serial transform section 210 acquires the control signal as in the serial/parallel transform section 207, extracts data (data corresponding to points to which subcarriers are allocated) corresponding to points to which data is assigned in the IFFT section 112 in the transmission source apparatus, from among signals output in parallel from the propagation channel compensation section 209 for each of the number of FFT points, and rearranges the data into a series.

A demodulation section 211 performs demodulation processing for QPSK and 16 QAM on the output signal from the parallel/serial transform section 210, and calculates a soft decision result such as coded bit LLR (Log Likelihood Ratio). In addition, the demodulation section 211 may calculate a hard decision result. Based on the pattern of interleaving that the apparatus of the transmission source provides, a deinterleave section 212 rearranges the arrangement of the output data sequence from the demodulation section 211. For example, when a signal transmitted from the transmission apparatus is received, the deinterleave section 212 performs processing of restoring a data arrangement performed in the interleave section in the transmission apparatus to an original data arrangement.

A depuncture section 213 performs depuncturing processing on the output data sequence from the deinterleave section 212, based on a pattern of puncturing that the apparatus of the transmission source performs, and outputs the resultant to a combining section 214 and received signal storing section 216. For example, in the case of receiving a signal xc such that the apparatus of the transmission source performs the puncturing processing in the puncture section (107c) as shown in FIG. 2 using puncture pattern 1 of FIG. 4 on the output signal (x1,z1,z'1,x2,z2,z'2,x3,z2,z'2,x4,z4,z'4,x5,z'5, x6,z6,z'6) from the error correcting coding section (107b) as shown in FIG. 2, the depuncture section 213 inserts virtual values to positions corresponding to bits thinned in the puncture section (107c) as shown in FIG. 2. When it is assumed that a received signal with respect to xc of the signal punctured by pattern 1 is xr=(xr1,zr1,xr2,xr3,xr4,zr'4,xr5,xr6), and that the virtual value is "0", the output signal of the depuncture section 213 is (xr1,zr1,0,xr2,0,0,xr3,0,0,xr4,0,zr'4,xr5,0,0,xr6,0, 0). In the case of receiving a received signal x'r=(zr'1,zr'2,zr4, zr5) with respect to the signal x'c subjected to the puncturing processing by puncture pattern 2, the output signal is (0,0, zr'1,0,0,zr'2,0,0,0,0,zr4,0,0,zr5,0,0,0,0).

In addition, in the reception apparatus 200, the GI removing section 206, serial/parallel transform section 207, FFT section 208, propagation channel compensation section 209, parallel/serial transform section 210, demodulation section 211, deinterleave section 212, and depuncture section 213 are called the signal detection section 219, calculate a soft decision result such as coded bit LLR by signal processing including the demodulation processing on a signal of a first-transmitted packet or a signal of a retransmitted packet such that the antenna section 201 receives the signal and that the reception section 202 converts the signal into the digital signal, and thereby perform signal detection. In addition, the signal detection section is not limited to the aforementioned section, as long as the section has a portion capable of calculating coded bit LLR or the like.

The received signal storing section 216 stores the output signal from the depuncture section 213 for each retransmission, while inputting the stored signal to the combining section 214. For example, when a pth retransmitted packet is output from the depuncture section 213 (when receiving a pth retransmitted packet), the section 216 inputs output signals of the depuncture section 213 received in the first to p−1th times stored in the received signal storing section to the combining section 214. The combining section 214 combines the signal from the depuncture section 213 and the signals stored in the received signal storing section 216. For example, when the pth retransmitted packet is received, the combining section 214 combines the data of the pth retransmitted packet from the depuncture section 213 and the data of the first to p−1th retransmitted packets (including the first-transmitted packet) from the received signal storing section 216. When it is assumed that the output from the depuncture section 213 when the pth retransmitted packet is received is gp(m) (in addition, m is an index of coded data constituting the packet, and the maximum value is the number of bits of the packet), the output signal λp of the combining section 214 when receiving the pth packet signal is Equation (1).

[Eq. 1]

$$\lambda_p = \sum_{u=1}^{p} \alpha_u g_u(m) \quad (1)$$

In addition, in the foregoing, the case is shown that signals of all the retransmitted packets are combined, and it is also possible to combine only some of the signals of the retransmitted packets. The weight coefficient αu may be multiplied for each retransmitted packet (including the first-transmitted packet). For example, when the first-transmitted packet (u=1) is data-modulated by 16 QAM and the pth received packet (u=p) is data-modulated by QPSK, it is also possible to weight so that α1<αp.

Figure 12:
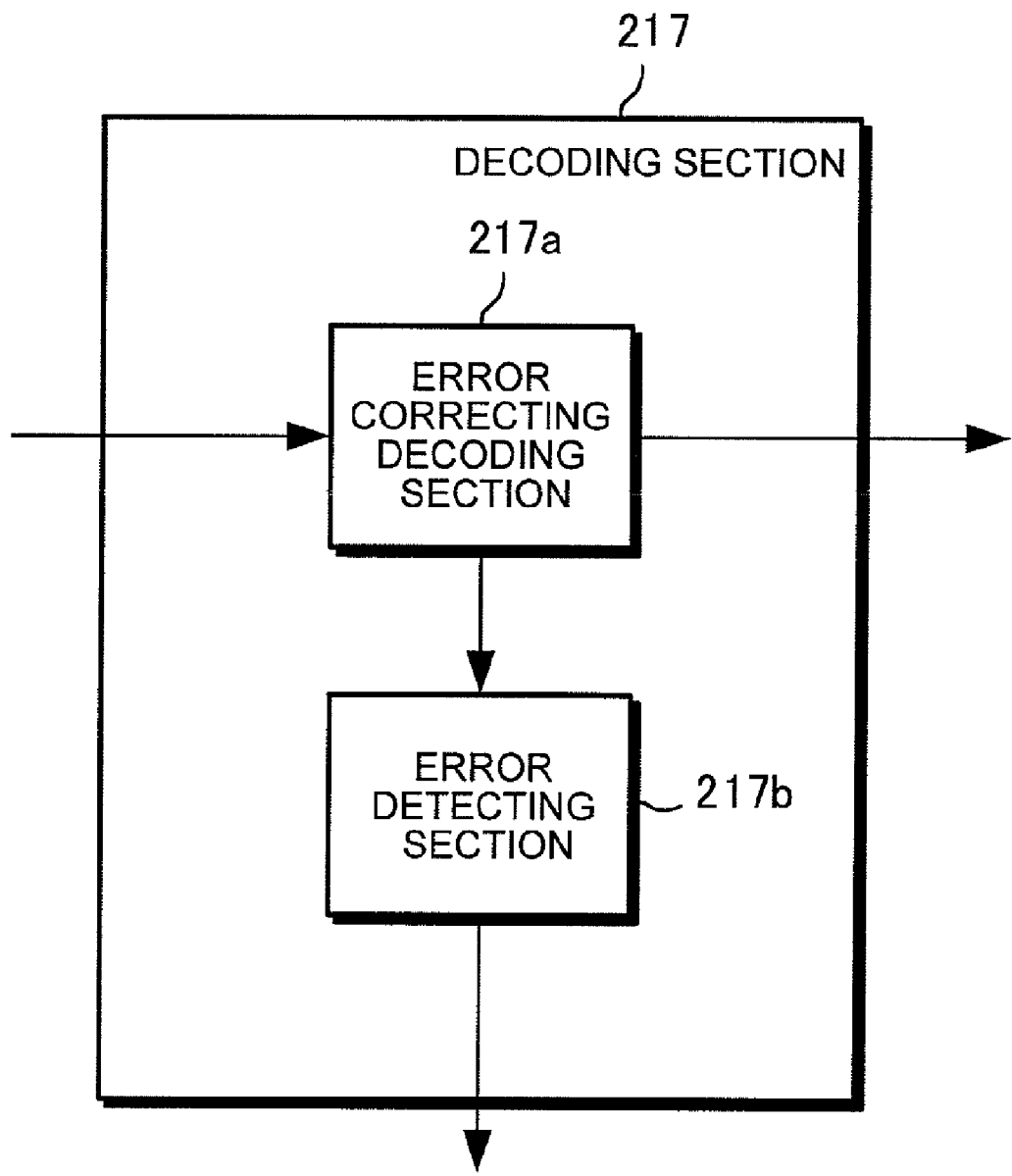
FIG. 12 is a block diagram illustrating a schematic configuration of a decoding section.

Based on coding that the apparatus of the transmission source performs, a decoding section 217 performs decoding processing on the output signal from the combining section 214. FIG. 12 is a block diagram illustrating a schematic configuration of the decoding section 217. The decoding section 217 has an error correcting decoding section 217a and error detecting section 217b. In HARQ, when the reception section 202 receives the pth packet signal, the decoding section 217 performs the decoding processing on the output signal λp from the combining section 214. The error correcting decoding section 217a performs error correcting decoding processing associated with error correcting coding such as turbo coding and convolutional coding that the apparatus of the transmission source performs, and calculates a soft decision output result such as LLR (Log Likelihood Ratio) of coded bits to input to the error detecting section 217b. The error detecting section 217b performs hard decision processing on the LLR, further performs error detecting processing on the packet by error detection such as CRC (Cyclic Redundancy Check) provided by the apparatus that transmits the received signal, and generates error detection information.

In FIG. 9, an acknowledgement signal generating section 218 generates a data sequence including control data indicative of the presence or absence of packet error from the error detection result in the decoding section 217, performs signal processing such as error correcting coding and data modulation, and thereby generates an acknowledgement signal. Further, the section 218 converts the acknowledgement signal into an analog signal (D/A conversion), and further converts the signal into a signal (baseband signal) with a transmissible frequency band. In addition, a communication scheme of the acknowledgement signal includes OFDM, single-carrier modulation scheme, etc. and is only required to enable the transmission apparatus of the transmission source of the received signal to restore. When a signal indicative of "the absence of packet error" is input from the decoding section 217, the section 218 generates an ACK signal as an acknowledgement signal indicating that the reception is correctly completed for the apparatus of the transmission source of the received signal. Meanwhile, when a signal indicative of "the presence of packet error" is input from the decoding section 217, the section 218 generates a NACK signal as an acknowledgement signal for requesting the apparatus of the transmission source to retransmit the packet.

Figure 13:
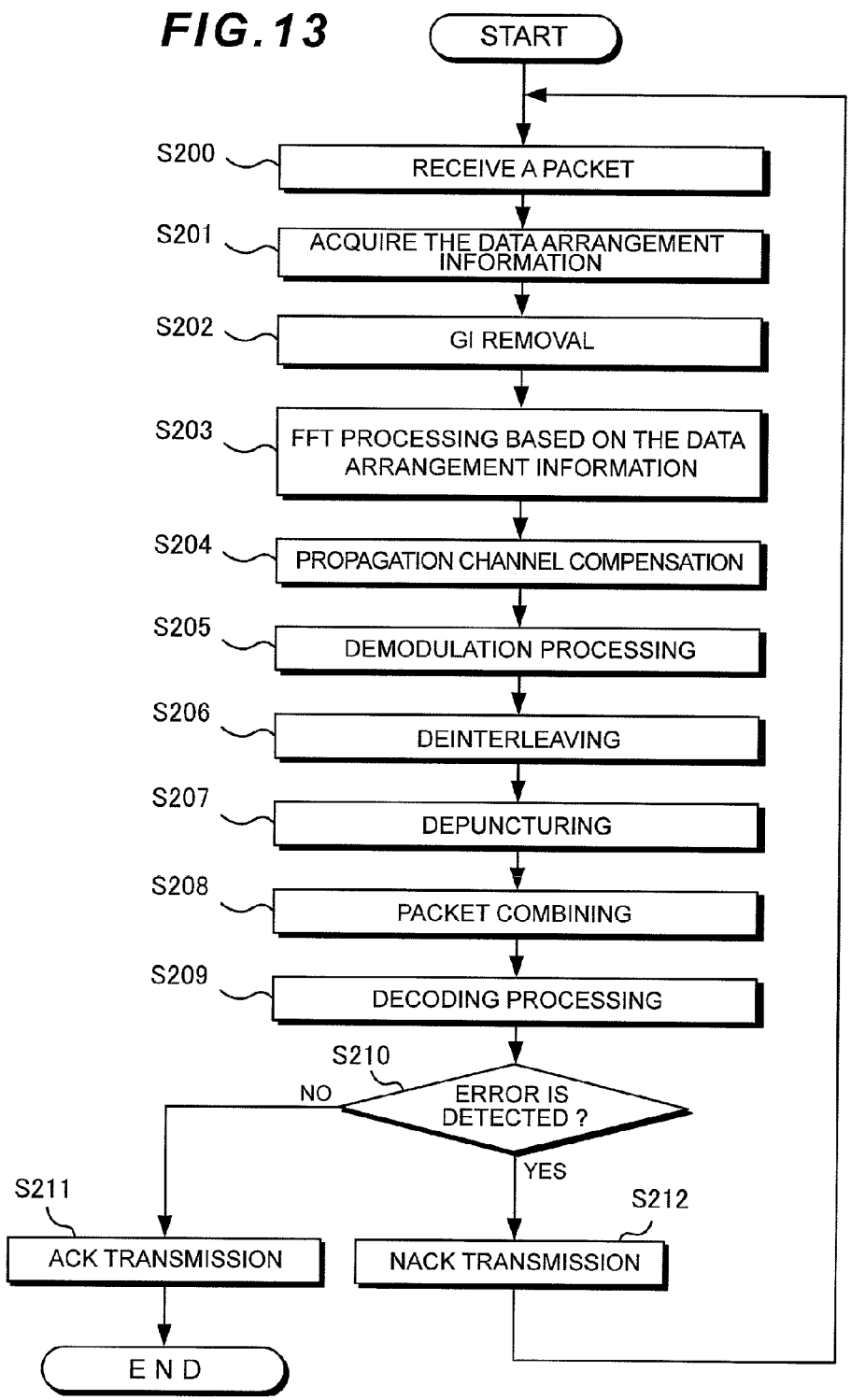
FIG. 13 is a flowchart illustrating the operation of the reception apparatus according to Embodiment 1.

FIG. 13 is a flowchart illustrating the operation of the reception apparatus according to this Embodiment. When a pth retransmitted packet (including the first-transmitted packet) is received (S200), the apparatus acquires the information indicative of a data arrangement of FFT from a control signal included in the signal of the pth retransmitted packet (S201). The GI removing section 206 removes a GI from a data signal received in the pth retransmitted packet, based on the information indicative of a received signal GI length obtained from the control signal (S202). Next, based on the information indicative of the data arrangement, the output signal from the GI removing section 206 is subjected to assignment to input points of FFT and FFT processing. The FFT processed (S203) data is multiplied by a weight for compensating for propagation channel distortion calculated from the propagation channel estimation result (S204), and then, is subjected to data demodulation processing such as QPSK and 16 QAM (S205), deinterleaving processing (S206), and depuncturing (S207).

Next, the reception apparatus combines the signal obtained by performing depuncturing on the signal of the pth retransmission signal and signals of retransmitted packets (including the first-transmitted packet) received in the first to p−1th times stored in the received signal storing section 216 (S208). The reception apparatus performs the decoding processing using the combined signal (S209), and detects whether an error exists in the decoded result (S210). When any error does not exist (S209), the reception apparatus generates an ACK signal, and transmits the signal to the transmission source apparatus (S211). When the error exits, the reception apparatus generates a NACK signal, transmits the signal to the transmission source apparatus, thereby requests the retransmission from the transmission source apparatus (S212), and waits for reception of a next retransmitted packet.

In addition, in the foregoing, the case is described where the subcarrier spacing is the same in retransmitted packets (second and subsequent transmitted packets), but it is also possible to vary the subcarrier spacing for each number of retransmission times.

Further, IFFT and FFT of the transmission apparatus and reception apparatus is only required to be techniques such as IDFT and DFT enabling the data to be transformed on the frequency axis and time axis. Furthermore, this Embodiment describes the case where the OFDM system is applied as multicarrier transmission, and the invention is similarly applicable to other multicarrier schemes such as MC-CDM (Multi Carrier Code Division Multiplexing) and OFDMA (Orthogonal Frequency Division Multiple Access). Still furthermore, in transmission schemes such as SC-FDMA (Single Carrier Frequency Division Multiple Access) using FFT, DFT and the like, the concept of varying the subcarrier spacing is applicable. As described above, according to Embodiment 1, the puncture pattern is considered for each number of retransmission times (the first transmission and for each retransmission), data assignment to the IFFT section 112 is thereby made to vary the subcarrier spacing, and it is thus possible to actualize the communication system to which is applied Hybrid-ARQ (HARQ) having resistance to the time variation of fading and extremely delayed version.

Embodiment 2

This Embodiment describes other transmission apparatus and reception apparatus for increasing the subcarrier spacing in a first-transmitted packet and retransmitted packet in an OFDM communication system for performing packet communications to which HARQ is applied. Shown herein are the transmission apparatus and reception apparatus which vary the number of FFT points in OFDM in the first-transmitted packet and retransmitted packet.

Figure 14:
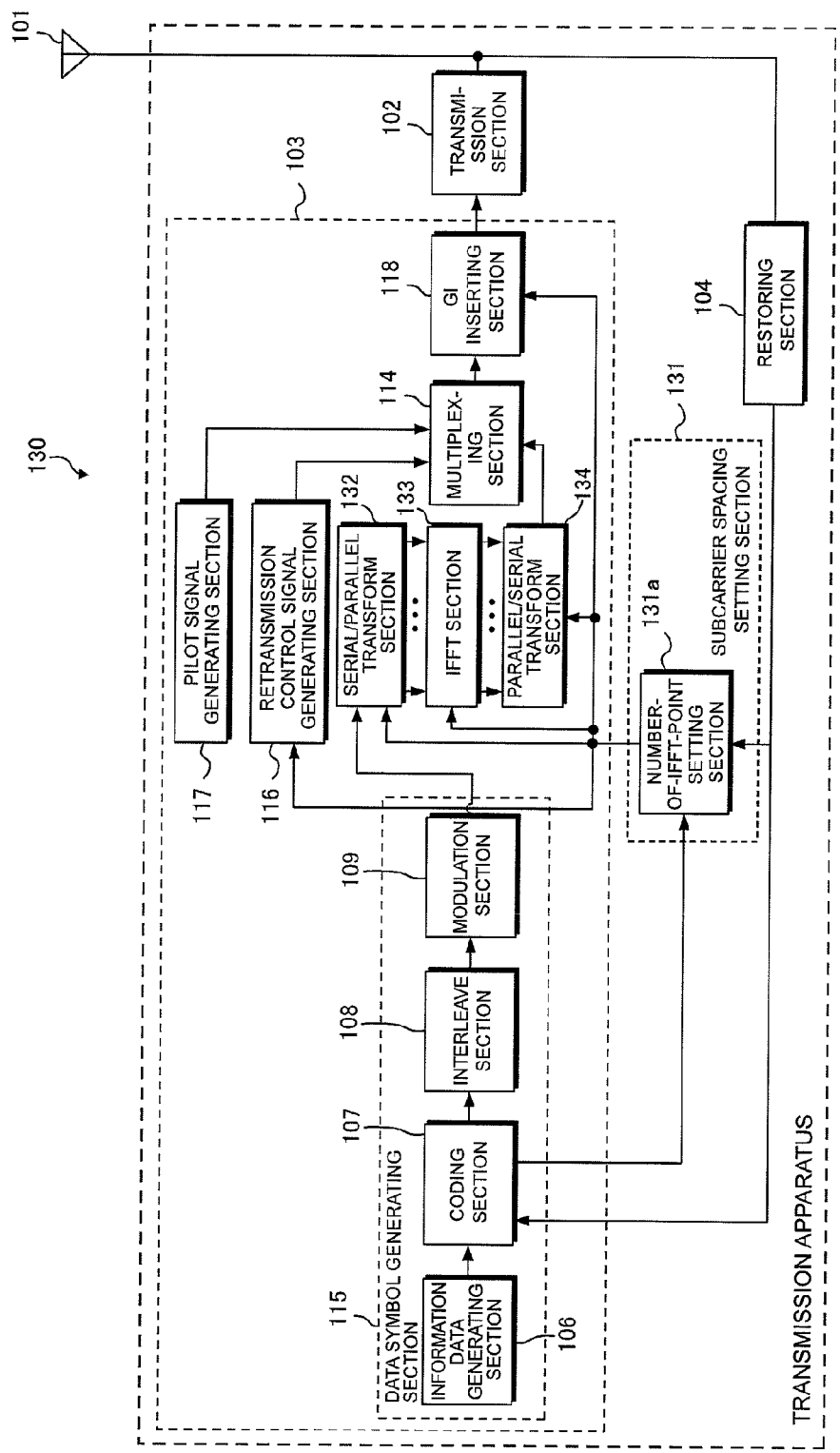
FIG. 14 is a block diagram illustrating a schematic configuration of a transmission apparatus according to Embodiment 2.

FIG. 14 is a block diagram illustrating a schematic configuration of a transmission apparatus 130 according to this Embodiment. As compared with the transmission apparatus 100 according to Embodiment 1, a subcarrier spacing setting section 131, serial/parallel transform section 132, IFFT section 133 and parallel/serial transform section 134 are different. The other configuration is the same as in Embodiment 1. The subcarrier spacing setting section 131 has a number-of-IFFT-point setting section 131a for setting the number of IFFT points. When a NACK signal is input from the restoring section 104, the number-of-IFFT-point setting section 131a acquires the number-of-bit information in the puncturing processing of next-retransmitted data from the coding section 107, and based on the number-of-bit information, sets the number of IFFT points in the IFFT section 133. It is also possible to acquire a puncture pattern as the number-of-bit information.

The IFFT section 133 performs frequency/time transform using the number of IFFT points set in the number-of-IFFT-point setting section 131a. The serial/parallel transform section 132 rearranges a modulated symbol sequence from the modulation section 109 into parallel based on the number of IFFT points. The parallel/serial transform section 134 rearranges the output signal from the IFFT section 133 into a series based on the number of IFFT points. The error correcting coding section 107b in the coding section 107 performs coding of R=⅓, and the puncture section 107c performs the puncturing processing based on pattern 1 in the first transmission, while performing the puncturing processing based on pattern 2 in the retransmission.

Shown herein is an example of a rearrangement in the serial/parallel transform section 132 and parallel/serial transform section 134 in the OFDM transmission apparatus using QPSK as a modulation scheme in the modulation section 109 and the number of subcarriers three-fourths the number of IFFT points. In addition, the ratio of the number of subcarriers to the number of IFFT points is dependent on the band of a guard band set to reduce interference to adjacent channels. It is assumed in the first transmission that a modulated symbol sequence output from the modulation section 109 with respect to data inputs obtained by performing puncturing on coded bits using puncture pattern 1 is d=(d1, d2, d3, ..., d47,d48,d49,d50, ...), and that an output from the IFFT section 133 is s=(s1,s2,s3, ..., s63,s64,s65, ...).

In the first transmission, when the number-of-IFFT-point setting section 131a sets the number of points of IFFT at "64" from the puncture pattern, as shown in FIG. 5, the serial/parallel transform section 132 rearranges the modulated symbol sequence to parallel on a 48-item data basis where "48" is the number of subcarriers associated with the number of IFFT points. When the number-of-IFFT-point setting section 131a sets the number of points of IFFT at "64" from the puncture pattern, the parallel/serial transform section 134 rearranges the data input from IFFT in parallel on a 64-item basis to a series.

FIG. 15 illustrates a rearrangement in the serial/parallel transform section 132, IFFT section 133 and parallel/serial transform section 134 in the retransmission. It is assumed in the retransmission that a modulated symbol sequence output from the modulation section 109 with respect to data obtained by performing puncturing on coded bits using puncture pattern 2 is d'=(d'1, d'2,d'3, . . . , d'23,d'24,d'25,d'26, . . . ), and that an output from the IFFT section 133 is s'=(s'1,s'2,s'3, . . . , s'31,s'32,s'33,S'34 . . . ). Since puncture pattern 2 in the retransmission provides the number of bits one-half that of puncture pattern 1 of the first transmission, the modulation symbol sequence is also a half. Accordingly, based on the puncture pattern, the number-of-IFFT-point setting section 131a sets the IFFT points in the IFFT section 133 also at a half (32 points) of that in the first transmission. Based on the number of IFFT points set by the number-of-IFFT-point setting section 131a, the serial/parallel transform section 132 rearranges the modulated symbol sequence into parallel on a 24-item data basis where "24" is the number of subcarriers associated with the number of IFFT points. When the number-of-IFFT-point setting section 131a sets the number of points of IFFT at "32" from the puncture pattern, the parallel/serial transform section 134 rearranges the data input from IFFT in parallel on a 32-item basis into a series.

As described above, the subcarrier spacing is made variable by using the IFFT section 133 for varying the number of IFFT points in consideration of the number of bits of the puncture pattern, and the serial/parallel transform section 132 and parallel/serial transform section 134 based on the number of IFFT points. As discussed previously, by increasing the subcarrier spacing, resistance to the time variation of fading is enhanced, and it is possible to improve the quality of a retransmitted packet.

In addition, the number-of-IFFT-point setting section 131a can beforehand determine the numbers of IFFT points in the transmission of a first-transmitted packet and in the transmission of a retransmitted packet, instead of using the number-of-bit information in the puncturing processing. For example, the number-of-IFFT-point setting section 131a stores a table for making the number of IFFT points in the transmission of a retransmitted packet one-half that in the transmission of a first-transmitted packet (for example, beforehand stores that the number of IFFT points is "64" in the transmission of a first-transmitted packet, and that the number of IFFT points is "32" in the transmission of a retransmitted packet), and inputs the number of IFFT points of the transmission of a first-transmitted packet to the serial/parallel transform section 132 and parallel/serial transform section 134 when an input acknowledgment signal is ACK, while inputting the number of IFFT points of the transmission of a retransmitted packet to the serial/parallel transform section 132 and parallel/serial transform section 134 when an input acknowledgment signal is NACK.

FIG. 16 is a block diagram illustrating a schematic configuration of a reception apparatus 250 according to this Embodiment. As compared with the reception apparatus according to Embodiment 1, a control signal restoring section 251, serial/parallel transform section 252, FFT section 253 for performing FFT (Fast Fourier Transform) and parallel/serial transform section 254 are different. The other configuration is the same as in Embodiment 1. The control signal restoring section 251 restores a control signal (control channel) indicating signal processing parameters including the number of retransmission times, information indicating the subcarrier spacing such as the number of subcarriers, a GI length, data modulation scheme and the like that the transmission source performs on the data signal, among output signals of the reception section 202. The control signal is only required to include the signal processing parameters necessary for the reception apparatus to restore the data signal.

Based on the control signal indicating the number of FFT points acquired from the control signal restoring section 251, the serial/parallel transform section 252 rearranges the output signal from the GI removing section 206 into parallel in the same data assignment as that the transmission source apparatus performs. Based on the control signal indicating the number of FFT points acquired from the control signal restoring section 251, the FFT section 253 performs frequency/time transform on the output signal from the serial/parallel transform section 252 by FFT. Based on the control signal indicating the number of FFT points acquired from the control signal restoring section 251, the parallel/serial transform section 254 rearranges the output signal from the propagation channel compensation section 209 into a series in the same data assignment as that the transmission source apparatus performs.

It is assumed in the first transmission that a received signal sequence output from the GI removing section 206 is r=(r1, r2,r3, . . . , r64,r65,r66, . . . ), and that the output from the propagation channel compensation section 209 is R=(R1,R2, R3, . . . , R64,R65,R66, . . . ). As the first transmission, in receiving a transmission signal set for the number of IFFT points of 64 and the number of subcarriers of 48 as shown in FIG. 5, the operations of the serial/parallel transform section 252 and parallel/serial transform section 254 are performed as shown in FIG. 10. In other words, in the first transmission, according to the information indicating the number of IFFT points from the control signal restoring section 251, the received signal sequence r is sequentially rearranged into parallel using the number of FFT points as a unit. As in the serial/parallel transform section 252, the parallel/serial transform section 254 acquires the information indicating the number of FFT points, and sequentially rearranges, into a series, output data from FFT indexes corresponding to points to which the modulated symbol sequence d is allocated in the IFFT section 133 of the transmission source apparatus, among signals output in parallel for each of the number of FFT points (on a 64-point basis) from the propagation channel compensation section 209. In other words, the section 254 sequentially extracts 48 items from among data R that is input in parallel on a 64-item basis from the propagation channel compensation section 209, and rearranges the data items into a series.

FIG. 17 is a diagram illustrating a rearrangement in the serial/parallel transform section 252, FFT section 253, propagation channel compensation section 209, and parallel/serial transform section 254 of the reception apparatus in the retransmission. FIG. 17 shows the case of receiving a transmission signal set for the number of IFFT points of 32 and the number of subcarriers of 24. It is indicated in the retransmission that a received signal sequence output from the GI removing section 206 is r'=(r'1,r'2, . . . , r'32,r'33,r'34, . . . ), and that the output from the propagation channel compensation section 209 is R'=(R'1,R'2,R'3, . . . , R'32,R33,R34, . . . ). In the retransmission, according to the information indicating the number of IFFT points from the control signal restoring section 251, the received signal sequence r is sequentially rearranged into parallel on a 32-item data basis where "32" is the number of FFT points.

As in the serial/parallel transform section 252, the parallel/serial transform section 254 acquires the information indicating the number of FFT points, and sequentially rearranges, into a series, output data from FFT indexes corresponding to points to which the modulated symbol sequence d' is allocated in the IFFT section 133 of the transmission source apparatus, among signals output in parallel for each of the number of FFT points (on a 32-point basis) from the propagation channel compensation section 209. In other words, the section 254 sequentially extracts 24 items from among data R' that is input in parallel on a 32-item basis from the propagation channel compensation section 209, and rearranges the data items into a series. In addition, in the foregoing, the number-of-FFT-point information is transmitted by the control signal for each transmission, but can be beforehand known between the transmission apparatus and the reception apparatus.

In addition, in the reception apparatus 250, the GI removing section 206, serial/parallel transform section 252, FFT section 253, propagation channel compensation section 209, parallel/serial transform section 254, demodulation section 211, deinterleave section 212, and depuncture section 213 are called the signal detection section 255, calculate a soft decision result such as coded bit LLR by signal processing including the demodulation processing on a signal of a first-transmitted packet or a signal of a retransmitted packet such that the antenna section 201 receives the signal and that the reception section 202 converts the signal into the digital signal, and thereby perform signal detection. In addition, the signal detection section 255 is not limited to the aforementioned section, as long as the section has a portion capable of calculating coded bit LLR or the like.

As described above, by varying the number of IFFT points and the number of FFT points in consideration of the puncture pattern in the first transmission and for each retransmission, the subcarrier spacing is varied. By this means, it is possible to actualize the communication system to which is applied Hybrid-ARQ (HARQ) having resistance to the time variation of fading and extremely delayed version.

In addition, Embodiment 1 describes the case that the subcarrier spacing setting section has the data arrangement setting section, and Embodiment 2 describes the case that the subcarrier spacing setting section has the number-of-IFFT-point setting section. However, the present invention is not limited to these forms, and the subcarrier spacing setting section may have both functions of the data arrangement setting section and the number-of-IFFT-point setting section.

The invention claimed is:

1. A transmission apparatus applied to a communication system in which the transmission apparatus and a reception apparatus perform automatic repeat request control therebetween, comprising:
    a data symbol generating section that generates a retransmission signal with the lower number of data symbols than in a first transmission signal;
    a subcarrier spacing setting section that sets a subcarrier spacing used in transmitting the retransmission signal to be larger than the subcarrier spacing used in transmitting the first transmission signal;
    an IFFT section that performs IFFT (Inverse Fast Fourier Transform) on an input signal based on the subcarrier spacing set in the subcarrier spacing setting section; and
    a transmission section that transmits the first transmission signal and at least one retransmission signal,
    wherein the subcarrier spacing is set based on the number of data symbols.

2. The transmission apparatus according to claim 1, wherein the subcarrier spacing setting section has a data arrangement setting section that arranges data by allocating data constituting a transmission signal to input points of the IFFT section at least one-point allocation intervals, while thinning output data from the IFFT section corresponding to the allocation intervals.

3. The transmission apparatus according to claim 1, wherein the subcarrier spacing setting section has a number-of-point setting section that sets the number of points in the IFFT section.

4. The transmission apparatus according to claim 1, wherein the data symbol generating section has an error correcting coding section that adds redundant bits to information bits, and a puncture section that thins more coded bits output from the error correcting coding section in the retransmission signal than in the first transmission signal, and
    the subcarrier spacing is set based on a puncture pattern thinned in the puncture section.

5. The transmission apparatus according to claim 1, further comprising:
    a GI adding section which sets a GI (Guard Interval) length so that an OFDM (Orthogonal Frequency Division Multiplexing) symbol length is constant, based on a data arrangement pattern output from the subcarrier spacing setting section, and adds a GI based on the set GI length to generate a transmission signal.

6. A communication system in which a transmission apparatus and a reception apparatus perform automatic repeat request control therebetween, comprising:
    the transmission apparatus according to claim 1,
    the reception apparatus having a reception section that receives a first transmission signal and at least one retransmission signal from the transmission apparatus that is a communicating party,
    an FFT section that performs FFT (Fast Fourier Transform) on a received signal based on a subcarrier spacing in the received signal received in the reception section,
    a signal detection section that performs demodulation processing on a plurality of first transmission signals or retransmission signals received in the reception section,
    a combining section that combines the first transmission signal or the retransmission signal that is a signal detected in the signal detection section, and
    a decoding section that performs decoding processing on the combined signal to obtain a result of the decoding processing.

7. A transmission method in a transmission apparatus applied to a communication system in which the transmission apparatus and a reception apparatus perform automatic repeat request control therebetween, at least including:
    generating, in a data symbol generating section, a retransmission signal with the lower number of data symbols than in a first transmission signal;
    setting, in a subcarrier spacing setting section, a subcarrier spacing used in transmitting the retransmission signal to be larger than the subcarrier spacing used in transmitting a first transmission signal;
    performing, in an IFFT section, IFFT on an input signal based on the subcarrier spacing set in the subcarrier spacing setting section; and
    transmitting, in a transmission section, the first transmission signal and at least one retransmission signal,
    wherein the subcarrier spacing is set based on the number of data symbols.

* * * * *